US005493606A

United States Patent [19]
Osder et al.

[11] Patent Number: 5,493,606
[45] Date of Patent: Feb. 20, 1996

[54] MULTI-LINGUAL PROMPT MANAGEMENT SYSTEM FOR A NETWORK APPLICATIONS PLATFORM

[75] Inventors: Barbara E. Osder, Erdenheim; Edwin M. Elrod, Downingtown; Alex C. Freiman, New Britain, all of Pa.; Timothy J. Hogan, Wellington, New Zealand

[73] Assignee: Unisys Corporation, Blue Bell, Pa.

[21] Appl. No.: 251,863

[22] Filed: May 31, 1994

[51] Int. Cl.⁶ .................................................. H04M 1/64
[52] U.S. Cl. .............................. 379/67; 379/88; 379/89; 364/419.08; 364/419.01; 381/43; 381/51; 434/156; 434/157
[58] Field of Search ............................ 379/67, 88, 89; 364/419.01, 419.02, 419.05, 419.08; 381/43, 51; 434/156, 157, 308

[56] References Cited

U.S. PATENT DOCUMENTS

| | | | |
|---|---|---|---|
| 4,654,798 | 3/1987 | Taki et al. | 364/419 |
| 4,958,366 | 9/1990 | Hashimoto | 379/74 |
| 5,307,265 | 4/1994 | Winans | 364/419.01 |
| 5,375,164 | 12/1994 | Jennings | 379/67 |
| 5,388,146 | 2/1995 | Morduch et al. | 379/201 |
| 5,412,712 | 5/1995 | Jennings | 379/67 |

Primary Examiner—Jeffery Hofsass
Assistant Examiner—Parag Dharia
Attorney, Agent, or Firm—Albert B. Cooper; Mark T. Starr

[57] ABSTRACT

In combination with the Network Application Platform (NAP), a Speech Interface to NAP (SPIN) creates or modifies a SPIN application for each language in which the prompts of a Network Application deployed on NAP are to be spoken. A prompt is mapped into a sequence of static and dynamic elements. Each SPIN application owns the prompt mappings, elements and element voice for the prompts to be played. The Network Application issues a PEP command to a Prompt Expansion Processor (PEP) to play an identified prompt in a language identified by a SPIN application ID. The command supplies the dynamic data to be played at the positions of the dynamic elements in the prompt definition PEP expands the command into a sequence of NAP Message IDs to play the sequence of NAP voice messages corresponding to the static and dynamic elements of the prompt mapping. The dynamic data is categorized into dynamic element types. A Dynamic Element Table contains an ordered list of logically grouped elements to support the dynamic data of a SPIN application. A Modular Dynamic Data Processor (MDDP) together with the Dynamic Element Table, in response to a dynamic element in a prompt and the dynamic data in the prompt command, expand the dynamic data in accordance with the dynamic element type. A user, to accommodate requirements of the SPIN application language, creates and deletes elements and voice therefor, reorders elements of prompt mappings, and varies the format in which the dynamic data is played utilizing the MDDP.

25 Claims, 20 Drawing Sheets

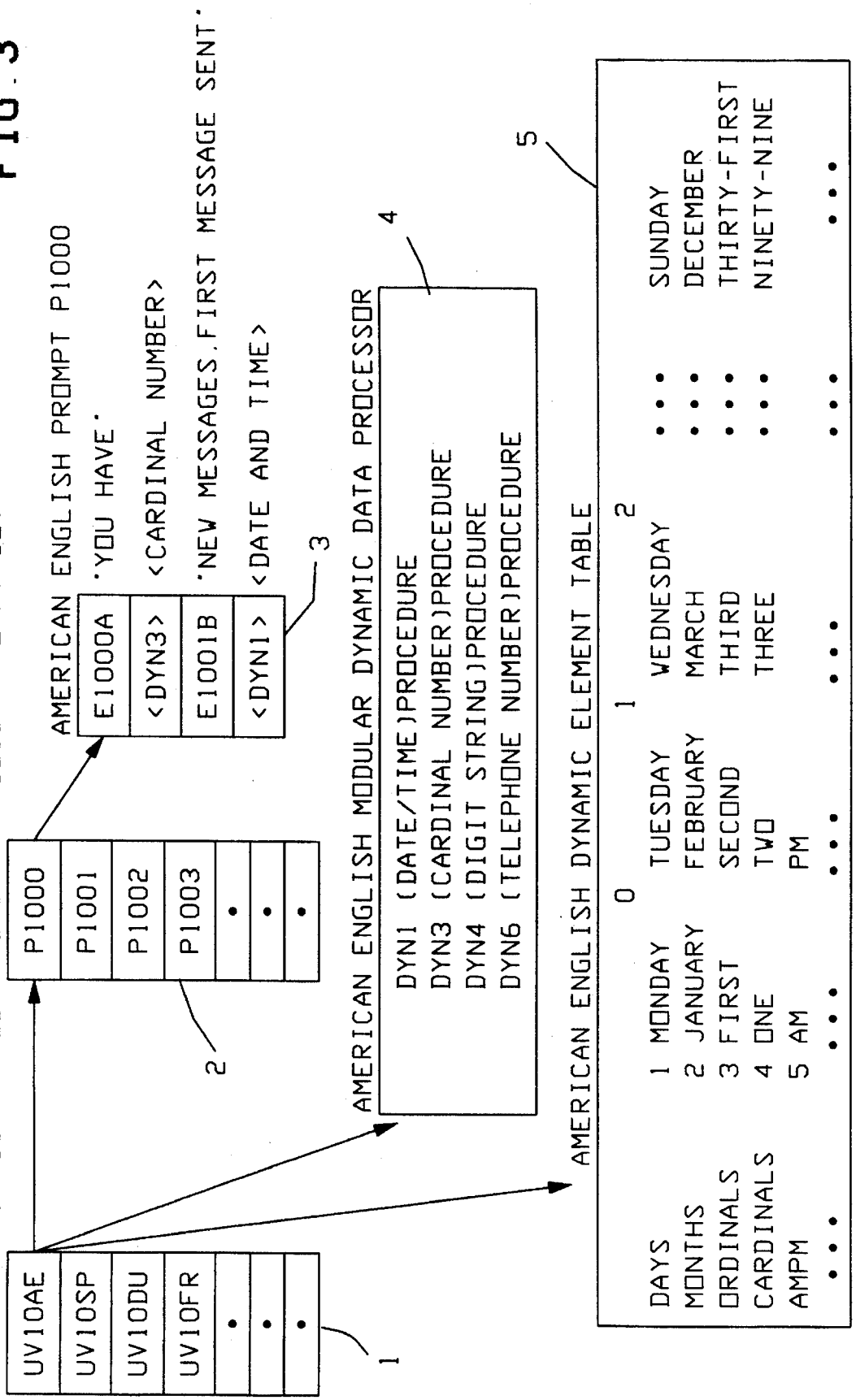

ELEMENT TABLE

| ELEMENT NAME TEXT LOCATOR | INFL | NAP MESSAGE ID |
|---|---|---|
| E1000A YOU HAVE | N | MESSAGE ID #1 |
|  | R |  |
|  | F |  |
| #0 ZERO | N | MESSAGE ID #2 |
|  | R | MESSAGE ID #3 |
|  | F | MESSAGE ID #4 |
| DAT014 MONDAY | N | MESSAGE ID #5 |
|  | R |  |
|  | F |  |
| DAT001 JANUARY | N | MESSAGE ID #6 |
|  | R |  |
|  | F |  |
| NOON NOON | N | MESSAGE ID #7 |
|  | R |  |
|  | F |  |
| E1000B NEWMESSAGES | N | MESSAGE ID #8 |
|  | R |  |
|  | F |  |

FIG. 5A

PROMPT TABLE

| PROMPT NAME | ELEMENTS | | | | |
|---|---|---|---|---|---|
| P1000 | MESSAGE ID #1 (E1000A) | <DYN 3> | ... | MESSAGE ID #8 (E1000B) | <DYN 1> |
| | | | | | |

INDEXED PROMPT TABLE

| ENTRY INDEX | ELEMENTS | | | | |
|---|---|---|---|---|---|
| 0 | MESSAGE ID | | | | |
| 1 | MESSAGE ID | | | | |
| 2 | MESSAGE ID | | | | |
| | | | | | |

DYNAMIC ELEMENT TABLE 83

| INDEX NUMBER | ELEMENT NAME | (VOICE) | INFECTION (N.R.F) |
|---|---|---|---|
| ROW 1 CARD | | | |
| 0-99 | #0-#99 | ZERO-NINETY-NINE | N |
| ROW 2 DTTIME | | | |
| 0-99 | #00-#99 | OH OH-NINETY-NINE | N |
| ROW 3 AMPM | | | |
| 0 | AM | AM | N |
| 1 | PM | PM | N |
| 2 | TODAY | TODAY | N |
| 3 | YESTER | YESTERDAY | N |
| 4 | NOON | NOON | N |
| 5 | MIDNIT | MIDNIGHT | N |
| 6 | AT | AT | N |
| ROW 4 DIGITN | | | |
| 0-9 | #0-#9 | ZERO-NINE | N |
| 10 | AA | A | N |
| 11 | BB | B | N |
| 12 | CC | C | N |
| 13 | DD | D | N |
| 16 | ## | POUND | N |
| 17 | ** | STAR | N |
| ROW 5 DIGITF | | | |
| 0-9 | #0-#9 | ZERO-NINE | F |
| 10 | AA | A | F |
| 11 | BB | B | F |
| 12 | CC | C | F |
| 13 | DD | D | F |
| 16 | ## | POUND | F |
| 17 | ** | STAR | F |

```
ROW 6 DAYS
0           DAT014      MONDAY          N
1           DAT015      TUESDAY         N
  •           •           •              •
  •           •           •              •
  •           •           •              •
5           DAT019      SATURDAY        N
6           DAT013      SUNDAY          N

ROW 7 MONTHS
0           DAT001      JANUARY         N
  •           •           •              •
  •           •           •              •
6           DAT012      DECEMBER        N

ROW 8 ORDNAL
0           DAT020      FIRST           N
1           DAT021      SECOND          N
  •           •           •              •
  •           •           •              •
29          DAT040      THIRTIETH       N
30          DAT059      THIRTY-FIRST    N

ROW 9 LGCARD
0           #100        HUNDRED         N
1           #1000       THOUSAND        N
2           #MIL        MILLION         N
3           #BIL        BILLION         N
4           #TRIL       TRILLION        N
5           #QDRIL      QUADRILLION     N
```

| ROW | INDEX NUMBERS | | | | | |
|---|---|---|---|---|---|---|
| | 0 | 1 | 2 | 3 | 4 | 5 |
| 1 CARD | #0 | #1 | #2 | #3 | #4 | #5 | ... |
| 2 DTTIME | #00 | #01 | #02 | #03 | #04 | #05 | ... |
| ... | | | | | | |
| 9 LGCARD | #100 | #1000 | #MIL | #BIL | #TRIL | #QDRIL | |

| ESP COMMAND | | |
|---|---|---|
| MESSAGE TYPE | NAP AIM COMMAND HEADER | PROMPT ID |
| SPIN APPLICATION ID | | |
| MESSAGE ID 1 | MESSAGE ID 2 | MESSAGE ID 3 |
| DATE AND TIME 1 | DATE AND TIME 2 | DATE AND TIME 3 |
| TEXT 1 | TEXT 2 | TEXT 3 |
| CARDINAL NUMBER 1 | CARDINAL NUMBER 2 | CARDINAL NUMBER 3 |
| DIGIT STRING 1 | DIGIT STRING 2 | |
| PHONE NUMBER 1 | PHONE NUMBER 2 | |

90 — 91 — 92 — 93 — 94

```
       <SCREEN IDENTIFIER>-<SCREEN TITLE>
  Action:▶                                  ◀
       <LIST OF AVAILABLE ACTIONS>
_____

<DISPLAY FIELDS>

<INPUT FIELDS>

<APPLICATION> <OFFLINE>    <SPIN USER ID>
```

```
            SPIN APPLICATION SELECTION
   Action:▶         ◀                        200
    201—CReate  ?CLOSE
_____

APPLICATION NAME: ▶      ◀—202

SPIN USER ID:     ▶       ◀(ID ONLY NEEDED TO PLAY OR
                            RECORD VOICE)

TO PROCESS AN EXISTING APPLICATION:
       ENTER THE APPLICATION NAME AND SPIN USER ID.

TO CREATE A NEW APPLICATION:
       ENTER CReate ON THE ACTION LINE. THEN ENTER A NEW
       APPLICATION NAME AND SPIN USER ID.

_____
               UNISYS CORPORATION
```

```
              MAIN-SPIN MAIN MENU
    Action:▶                                    ◀
              GO  ?CLOSE
    ──────────────────────────────────────────────

ELE   ELEMENT (CREATE,EDIT,DELETE)
       PRO   PROMPT  (CREATE,EDIT,DELETE)
       TRA   TRANSFER (COPY,DUMP,OR LOAD APPLICATIONS)
       CON   CONFIGURE
       DYN   DYNAMIC ELEMENT TABLE (CREATE,EDIT,DELETE)
       IND   INDEXED PROMPT TABLE (CREATE,EDIT,DELETE)
       MIS   MISCELLANEOUS FUNCTIONS

──────────────────────────────────────────────
    APP01      OFFLINE                 2151234
```

```
           ELE-ELEMEMT PROCESSING          250
     Action:▶        ◀
          CReate MOdify DElete PLay HOme  GO ?CLOSE
    ──────────────────────────────────────────────
     ELEMENT NAME:  ▶          ◀─251
     TEXT LOCATOR:  ▶              ◀
    252
      RECORD NOW?:  ▶ N ◀ (Y/N)   MSG. ID. (N):
                                           (R):
                                           (F):
      INFLECTION:   ▶ N ◀ (N,R,F)  253

VOICE FILE NAME: ▶                         ◀
     SCRIPT:
          ▶                              ◀
          ▶                              ◀
          ▶                              ◀
          ▶                              ◀
          ▶                              ◀
    ──────────────────────────────────────────────
     APP02     OFFLINE                  2151234
```

FIG. 12

```
           PRO-PROMPT PROCESSING            210
 Action:►                                  ◄
    CReate  MOdify  DElete  PLay  HOme   GO  ?CLOSE
─────────────────────────────────────────────────────
 PROMPT NAME:    ►         ◄─216
                       214\    212\     211\
   215\      213\     DYNAMIC  DYNAMIC  DYNAMIC
   ITEM     ELEMENT   ELEMENT  ELEMENT   DATA
  NUMBER     NAME      TYPE    SUBTYPE  LOCATION
     1       ► ◄       ► ◄      ► ◄      ► ◄
     2       ► ◄       ► ◄      ► ◄      ► ◄
     3       ► ◄       ► ◄      ► ◄      ► ◄
     4       ► ◄       ► ◄      ► ◄      ► ◄
     5       ► ◄       ► ◄      ► ◄      ► ◄
     6       ► ◄       ► ◄      ► ◄      ► ◄
     7       ► ◄       ► ◄      ► ◄      ► ◄
     8       ► ◄       ► ◄      ► ◄      ► ◄
     9       ► ◄       ► ◄      ► ◄      ► ◄
    10       ► ◄       ► ◄      ► ◄      ► ◄
    11       ► ◄       ► ◄      ► ◄      ► ◄
    12       ► ◄       ► ◄      ► ◄      ► ◄
   APP02    OFFLINE              2151234
```

FIG. 13

```
           PRO-PROMPT PROCESSING
 Action:► CR  ◄
    CReate  MOdify  DElete  PLay  HOme   GO  ?CLOSE
─────────────────────────────────────────────────────
 PROMPT NAME:   ► PRO123 ◄

DYNAMIC  DYNAMIC  DYNAMIC
   ITEM     ELEMENT  ELEMENT  ELEMENT   DATA
  NUMBER     NAME     TYPE    SUBTYPE  LOCATION
     1    ► E123A ◄   ► ◄      ► ◄      ► ◄
     2    ►       ◄   ► 3 ◄    ► ◄      ► ◄
     3    ►       ◄   ► 2 ◄    ► ◄      ► ◄
     4    ► E123B ◄   ► ◄      ► ◄      ► ◄
     5    ►       ◄   ► 3 ◄    ► ◄      ► ◄
     6    ►       ◄   ► 2 ◄    ► ◄      ► ◄
     7    ► E123B ◄   ► ◄      ► ◄      ► ◄
     8    ► AND   ◄   ► ◄      ► ◄      ► ◄
     9    ►       ◄   ► 3 ◄    ► ◄      ► ◄
    10    ►       ◄   ► 2 ◄    ► ◄      ► ◄
    11    ► E123B ◄   ► ◄      ► ◄      ► ◄
    12    ►       ◄   ► ◄      ► ◄      ► ◄
   APP02    OFFLINE              2151234
```

FIG. 14

```
┌────────────────────────────────────────────────────────────┐
│      PROMOD-MODIFY ITEMS FOR PROMPT  ◆PRO123◆              │
├────────────────────────────────────────────────────────────┤
│  PROMPT NAME:   ◆       ◆                           220    │
│                                                            │
│                        224      226      221               │
│       225    223    DYNAMIC  DYNAMIC  DYNAMIC    222       │
│       ITEM  ELEMENT ELEMENT  ELEMENT    DATA               │
│      NUMBER  NAME    TYPE    SUBTYPE  LOCATION   INS?      │
│         1  ◆E123A◆   ◆ ◆     ▶ ◀      ◆   ◆      ◆ ◆       │
│         2   ◆   ◆    ◆3◆     ▶ ◀      ◆ 1 ◆      ◆ ◆       │
│         3   ◆   ◆    ◆2◆     ▶ ◀      ◆ 1 ◆      ◆ ◆       │
│         4  ◆E123B◆   ◆ ◆     ▶ ◀      ◆   ◆      ◆ ◆       │
│         5   ◆   ◆    ◆3◆     ▶ ◀      ◆ 2 ◆      ◆ ◆       │
│         6   ◆   ◆    ◆2◆     ▶ ◀      ◆ 2 ◆      ◆ ◆       │
│         7  ◆E123B◆   ◆ ◆     ▶ ◀      ◆   ◆      ◆ ◆       │
│         8  ◆ AND ◆   ◆ ◆     ▶ ◀      ◆   ◆      ◆ ◆       │
│         9   ◆   ◆    ◆3◆     ▶ ◀      ◆ 3 ◆      ◆ ◆       │
│        10   ◆   ◆    ◆2◆     ▶ ◀      ◆ 3 ◆      ◆ ◆       │
│        11  ◆E123B◆   ◆ ◆     ▶ ◀      ◆   ◆      ◆ ◆       │
│        12   ◆   ◆    ◆ ◆     ▶ ◀      ◆   ◆      ◆ ◆       │
│   APP02    OFFLINE               2151234                   │
└────────────────────────────────────────────────────────────┘
```

FIG. 15

```
┌────────────────────────────────────────────────────────────┐
│      PROMOD-MODIFY ITEMS FOR PROMPT  ◆PRO123◆              │
├────────────────────────────────────────────────────────────┤
│  PROMPT NAME:   ◆       ◆                                  │
│                                                            │
│                     DYNAMIC  DYNAMIC  DYNAMIC              │
│       ITEM  ELEMENT ELEMENT  ELEMENT    DATA               │
│      NUMBER  NAME    TYPE    SUBTYPE  LOCATION   INS?      │
│         1  ◆E123A◆   ◆ ◆     ▶ ◀      ◆   ◆      ◆ ◆       │
│         2   ◆   ◆    ◆3◆     ▶ ◀      ◆ 3 ◆      ◆ ◆       │
│         3   ◆   ◆    ◆2◆     ▶ ◀      ◆ 3 ◆      ◆ ◆       │
│         4  ◆E123B◆   ◆ ◆     ▶ ◀      ◆   ◆      ◆ ◆       │
│         5   ◆   ◆    ◆3◆     ▶ ◀      ◆ 1 ◆      ◆ ◆       │
│         6   ◆   ◆    ◆2◆     ▶ ◀      ◆ 1 ◆      ◆ ◆       │
│         7  ◆E123B◆   ◆ ◆     ▶ ◀      ◆   ◆      ◆ ◆       │
│         8  ◆ AND ◆   ◆ ◆     ▶ ◀      ◆   ◆      ◆ ◆       │
│         9   ◆   ◆    ◆3◆     ▶ ◀      ◆ 2 ◆      ◆ ◆       │
│        10   ◆   ◆    ◆2◆     ▶ ◀      ◆ 2 ◆      ◆ ◆       │
│        11  ◆E123B◆   ◆ ◆     ▶ ◀      ◆   ◆      ◆ ◆       │
│        12   ◆   ◆    ◆ ◆     ▶ ◀      ◆   ◆      ◆ ◆       │
│   APP02    OFFLINE               2151234                   │
└────────────────────────────────────────────────────────────┘
```

```
             IND-INDEXED PROMPT TABLE
   Action:►          ◄
      CReate  MOdify   DElete   PLay   HOme      GO   ?CLOSE ENTRY    PROMPT   DESCRIPTION      ENTRY    PROMPT   DESCRIPTION
INDEX    NAME                      INDEX    NAME
   0    ►       ◄ MISSING PROMPT    13    ►         ◄
   1    ►       ◄ MISSING ELEMENT   14    ►         ◄
   2    ►       ◄ BAD DYN DATA      15    ►         ◄
   3    ►       ◄ MDDP ERROR        16    ►         ◄
   4    ►       ◄ USER ERROR        17    ►         ◄
   5    ►       ◄ 1 SEC. SILENCE    18    ►         ◄
   6    ►       ◄ RECORD TONE       19    ►         ◄
   7    ►       ◄ STD GREETING      20    ►         ◄
   8    ►       ◄ TECH DIFF         21    ►         ◄
   9    ►       ◄ RESERVED          22    ►         ◄
  10    ►       ◄ RESERVED          23    ►         ◄
  11    ►       ◄ RESERVED          24    ►         ◄
  12    ►       ◄ RESERVED          25    ►         ◄

APP02     OFFLINE                  2151234
```

```
            DYN-DYNAMIC ELEMENT TABLE        230
   Action:►          ◄
      CReate  MOdify   DElete   PLay   HOme      GO   ?CLOSE ROW NUMBER:  ►9   ◄ (1-999)—231
   ROW NAME:    ►LGCARD    ◄
       ELEMENT     INFLECTION        ELEMENT    INFLECTION
INDEX   NAME        (N.R.F)   INDEX   NAME       (N.R.F)
   0   ►#100  ◄   ►N◄    13   ►      ◄    ►N◄
   1   ►#1000 ◄   ►N◄    14   ►      ◄    ►N◄
   2   ►#MIL  ◄   ►N◄    15   ►      ◄    ►N◄
   3   ►#BIL  ◄   ►N◄    16   ►      ◄    ►N◄
   4   ►#TRIL ◄   ►N◄    17   ►      ◄    ►N◄
   5   ►#QDRIL◄   ►N◄    18   ►      ◄    ►N◄
   6   ►      ◄   ►N◄    19   ►      ◄    ►N◄
   7   ►      ◄   ►N◄    20   ►      ◄    ►N◄
   8   ►      ◄   ►N◄    21   ►      ◄    ►N◄
   9   ►      ◄   ►N◄    22   ►      ◄    ►N◄
  10   ►      ◄   ►N◄    23   ►      ◄    ►N◄
  11   ►      ◄   ►N◄    24   ►      ◄    ►N◄
  12   ►      ◄   ►N◄    25   ►      ◄    ►N◄

APP02     OFFLINE                  2151234
```

```
              PRO-PROMPT PROCESSING              210
   Action: ► CR ◄
   CReate   MOdify   DElete   PLay   HOme    GO  ?CLOSE
   ─────────────────────────────────────────────────────
   PROMPT NAME:    ► PCOLOR ◄

DYNAMIC   DYNAMIC    DYNAMIC
       ITEM     ELEMENT       ELEMENT   ELEMENT    DATA
       NUMBER   NAME          TYPE      SUBTYPE    LOCATION
         1    ► ECOLOR ◄    ►      ◄  ►      ◄   ►      ◄
         2    ►        ◄    ► 100 ◄   ►      ◄   ►      ◄
         3    ►        ◄    ►      ◄  ►      ◄   ►      ◄
         4    ►        ◄    ►      ◄  ►      ◄   ►      ◄
         5    ►        ◄    ►      ◄  ►      ◄   ►      ◄
         6    ►        ◄    ►      ◄  ►      ◄   ►      ◄
         7    ►        ◄    ►      ◄  ►      ◄   ►      ◄
         8    ►        ◄    ►      ◄  ►      ◄   ►      ◄
         9    ►        ◄    ►      ◄  ►      ◄   ►      ◄
        10    ►        ◄    ►      ◄  ►      ◄   ►      ◄
        11    ►        ◄    ►      ◄  ►      ◄   ►      ◄
        12    ►        ◄    ►      ◄  ►      ◄   ►      ◄
   ─────────────────────────────────────────────────────
   APP02      ONLINE                  2151234
```

```
              ELE-ELEMEMT PROCESSING              250
   Action: ► CR ◄
   CReate   MOdify   DElete   PLay   HOme    GO  ?CLOSE
   ─────────────────────────────────────────────────────
   ELEMENT NAME:   ► ECOLOR ◄
   TEXT LOCATOR:   ►              ◄

RECORD NOW?:    ► Y ◄ (Y/N)     MSG. ID. (N): 000456789123
                                            (R):
                                            (F):
   INFLECTION:     ► N ◄ (N,R,F)

VOICE FILE NAME: ►                                        ◄
   SCRIPT:
          ► YOUR BICYCLE IS               ◄
          ►                                ◄
          ►                                ◄
          ►                                ◄
          ►                                ◄
   ─────────────────────────────────────────────────────
   APP02      ONLINE                  2151234
```

```
            DYN-DYNAMIC ELEMENT TABLE              230
   Action: ► CR      ◄
         CReate  MOdify  DElete  PLay  HOme    GO  ?CLOSE
─────────────────────────────────────────────────────────
   ROW NUMBER:   ► 100 ◄  (1-999)
    ROW NAME:    ► COLORS     ◄
              ELEMENT    INFLECTION        ELEMENT    INFLECTION
    INDEX      NAME       (N,R,F)   INDEX   NAME       (N,R,F)
      0      ► CRED   ◄   ► N ◄     13    ►       ◄   ► N ◄
      1      ► CBLUE  ◄   ► N ◄     14    ►       ◄   ► N ◄
      2      ► CYELL  ◄   ► N ◄     15    ►       ◄   ► N ◄
      3      ► CGREEN ◄   ► N ◄     16    ►       ◄   ► N ◄
      4      ► CPURP  ◄   ► N ◄     17    ►       ◄   ► N ◄
      5      ►        ◄   ► N ◄     18    ►       ◄   ► N ◄
      6      ►        ◄   ► N ◄     19    ►       ◄   ► N ◄
      7      ►        ◄   ► N ◄     20    ►       ◄   ► N ◄
      8      ►        ◄   ► N ◄     21    ►       ◄   ► N ◄
      9      ►        ◄   ► N ◄     22    ►       ◄   ► N ◄
     10      ►        ◄   ► N ◄     23    ►       ◄   ► N ◄
     11      ►        ◄   ► N ◄     24    ►       ◄   ► N ◄
     12      ►        ◄   ► N ◄     25    ►       ◄   ► N ◄
─────────────────────────────────────────────────────────
   APP02      ONLINE                    2151234
```

```
            TRA-TRSNSFER                        240
   Action: ►      ◄
            COpy  ADd  HOme   GO  ?CLOSE
─────────────────────────────────────────────────────────
   FROM: FLAT FILE:   ►                          ◄
   OR:   APPLICATION: ►        ◄

TO:   FLAT FILE:   ►                          ◄
   OR:   APPLICATION: ►        ◄

ENTIRE APPLICATION?      ► N ◄ (Y/N)

PROMPTS   ALL? ► N ◄, OR LIST ► N ◄ UPDATE PROMPT LIST?  ► N ◄
   ELEMENTS  ALL? ► N ◄, OR LIST ► N ◄ UPDATE ELEMENT LIST? ► N ◄
   VOICE     ALL? ► N ◄, OR LIST ► N ◄ UPDATE VOICE LIST?   ► N ◄
   SCRIPTS   ALL? ► N ◄, OR LIST ► N ◄ UPDATE SCRIPT LIST?  ► N ◄

DYNAMIC ELEMENT TABLE?   ► N ◄
   INDEXED PROMPT TABLE?    ► N ◄

APP02      OFFLINE                   2151234
```

```
           ENTER PROMPTS FOR TRANSFER

► P1000 ◄      ►      ◄      ►      ◄
        ► P1100 ◄      ►      ◄      ►      ◄
        ► P1200 ◄      ►      ◄      ►      ◄
        ► P1300 ◄      ►      ◄      ►      ◄
        ► P1400 ◄      ►      ◄      ►      ◄
        ► P1500 ◄      ►      ◄      ►      ◄
        ► P1600 ◄      ►      ◄      ►      ◄
        ► P1700 ◄      ►      ◄      ►      ◄
        ► P1800 ◄      ►      ◄      ►      ◄
        ► P1900 ◄      ►      ◄      ►      ◄
        ► P2000 ◄      ►      ◄      ►      ◄
        ► P2100 ◄      ►      ◄      ►      ◄
        ► P2200 ◄      ►      ◄      ►      ◄
        ► P2300 ◄      ►      ◄      ►      ◄
        ► P2400 ◄      ►      ◄      ►      ◄
        ► P2500 ◄      ►      ◄      ►      ◄

APP02     OFFLINE              2151234
```

```
            MIS -MISCELLANEOUS FUNCTIONS
  Action:►                                   ◄
          HOme     GO    ?CLOSE VOIDEL   VOICE DELETION (REMOVE ALL VOICES THAT ARE MARKED
           FOR DELETION)

CACHE    BUILD PEP CACHE TABLES

APP01     OFFLINE              2151234
```

```
              IND-INDEXED PROMPT TABLE
    Action: ▶          ◀
       CReate  MOdify  DElete  PLay  HOme      GO  ?CLOSE ENTRY    PROMPT  DESCRIPTION    ENTRY    PROMPT  DESCRIPTION
    INDEX    NAME                   INDEX    NAME
      0    ▶SYSP00◀ MISSING PROMPT    13    ▶       ◀
      1    ▶SYSP01◀ MISSING ELEMENT   14    ▶       ◀
      2    ▶SYSP02◀ BAD DYN DATA      15    ▶       ◀
      3    ▶SYSP03◀ MDDP ERROR        16    ▶       ◀
      4    ▶SYSP04◀ USER ERROR        17    ▶       ◀
      5    ▶SYSP05◀ 1 SEC. SILENCE    18    ▶       ◀
      6    ▶SYSP06◀ RECORD TONE       19    ▶       ◀
      7    ▶SYSP07◀ STD GREETING      20    ▶       ◀
      8    ▶SYSP08◀ TECH DIFF         21    ▶       ◀
      9    ▶       ◀ RESERVED         22    ▶       ◀
     10    ▶       ◀ RESERVED         23    ▶       ◀
     11    ▶       ◀ RESERVED         24    ▶       ◀
     12    ▶       ◀ RESERVED         25    ▶       ◀
    APP02      OFFLINE
```

FIG. 24

MULTI-LINGUAL PROMPT MANAGEMENT SYSTEM FOR A NETWORK APPLICATIONS PLATFORM

BACKGROUND OF THE INVENTION

1. Field of the Invention

The invention relates to the Network Applications Platform (NAP) particularly with respect to the prompt management system therefor.

2. Description of the Prior Art

The NAP is described in U.S. Pat. No. 5,133,004, issued Jul. 21, 1992, and is assigned to the assignee of the present invention. The NAP contains telephone network functionality actuatable by commands from supported Network Applications, such commands controlling answering a telephone call, initiating a telephone call, and playing a voice message over an established telephone connection. Voice messages are identified by a NAP Message ID and are stored in a NAP Voice File accessed through a NAP Voice Input/Output Data Base (VIODB) containing the NAP Message IDs. The Network Application can command the NAP to receive, and store in the Voice File, a voice message from an established telephone connection. NAP assigns a Message ID to the message and returns the Message ID to the application. The commands to which NAP is responsive are denoted as Application Interface Module (AIM) commands and all of the described NAP structure and functionality is explained in detail in said Patent No. 5,133,004. Said Patent No. 5,133,004 is incorporated herein by reference in its entirety.

The NAP is provided with a prompt management system denoted as Voice Utility/Prompt Expansion Processor (VU/PEP). VU/PEP is described in the following VU/PEP documentation: A Series Network Applications Platform (NAP), System Administration Guide (4178 1279-000), December 1993; and A Series Network Applications Platform (NAP), Programming Reference Manual (4178 1287-000), Dec. 1993. Said VU/PEP documentation is incorporated herein by reference to detail the state of the art.

Although one VU can be used by all Network Applications, each Network Application must have one or more copies of its own PEP. A user creates or modifies the prompts to be spoken by the user's Network Application by interactively utilizing VU and NAP to generate a VU application that defines the prompt elements. A prompt is composed of and defined by a sequence of static and dynamic elements. A static element denotes a fixed phrase, whereas a dynamic element provides a location in the prompt for variable data to be provided by the Network Application at run time. For example, in the prompt "you have <number> new messages", the phrases "you have" and "new messages" are static elements whereas <number> is a dynamic element to be provided by the Network Application in accordance with the conditions at run time. The voice for the static elements may be recorded by the user over a telephone connection to NAP under control of the VU application. The voice for the static elements are recorded in the NAP Voice File identified by NAP Message IDs as explained in said Patent No. 5,133,004. The NAP Message IDs are returned by NAP to the VU application for storage in records in the VU database to be referenced when playing the prompts.

The dynamic data is managed pursuant to a fixed list of dynamic element types known as cardinal number, date/time, digit string, phone number, text identifier and NAP Message ID. The PEP contains arrays for expanding these dynamic data types over the range of dynamic data required. For example, the cardinal number array may contain elements for the numbers 0 through 99. The voice for the dynamic elements is recorded and stored, as discussed above, and the associated NAP Message IDs are appropriately stored in the arrays.

The user defines the prompts for the user's Network Application as ordered sequences of specific static elements and dynamic element types. These prompt definitions are interactively generated by the user utilizing VU and are stored in records in the VU database. These records are used by PEP to expand prompts for a given Network Application. These records may be cached in arrays first in order to improve performance. A Network Application invokes the playing of a prompt by issuing a Send Prompt (SP) or Enhanced Send Prompt (ESP) command to PEP naming the prompt and supplying the specific dynamic data appropriate to the run time conditions. The PEP expands the command into the sequence of NAP Message IDs appropriate to play the prompt. The Message IDs are loaded into a NAP Send Voice Message command for this purpose.

The SP and ESP commands are structured so that the dynamic data is always supplied in the command in the order it is to be used and is always used by PEP in the order it is supplied. Each supported dynamic element type is expanded according to a predetermined algorithm in PEP. For example, the prompt command might have date/time dynamic data arranged as MMDDYY. The data in this field is spoken in the order determined by the algorithm, such as day of the week, month, and day (e.g., "Thursday, May 19th"). The PEP is of fixed design so as to always expand the prompts in such a fixed manner. The design of VU/PEP is arranged for the playing of American English prompts. Accordingly, the Network Applications for NAP are written with the expectation that its prompts would be played in American English.

Although functioning well for the purposes intended, VU/PEP suffers from a number of disadvantages. A Network Application can only play its prompts in American English. If it is desired that a Network Application would play the same prompts in a second language, substantial reprogramming of the Network Application would be required. The prompts and elements for the second language would have to be added to the original set in order to create the required components in the second language. These new components would require unique identifiers. The Network Application would have to detect which language to play and use the appropriate prompt name in the Send Prompt Command. Additionally, the Network Application may be required to order different dynamic data in accordance with the language to be spoken. In other words, the Network Application itself would require an English version and another version for the second language. Because of syntactical and grammatical differences between languages, significant programming changes might also be required in the Network Application and PEP for supporting the second language. The problem may be further complicated if the second language utilizes adjectives that are gender sensitive. For example, Spanish requires gender agreement between adjectives and nouns. Thus, while English can say "one woman" or "one man", Spanish requires the "one" to be spoken differently based on the gender of the associated noun.

Similar problems are encountered because of the inflexibility of VU/PEP if, for example, it is desired to play time in the 24 hour military format as compared to the AM/PM 12 hour format of American English. Language differences in the playing of date and time may also result in similar difficulties. For example, in American English the date is played in month, day order, whereas in European languages date is spoken in day, month order.

In the VU/PEP that supports only American English, tables are utilized to store the prompt definitions with the elements thereof always in the same order. The expansion of dynamic data is always handled the same way by dynamic data processing code embedded in PEP. Because of this, it is appreciated that in order to provide a multi-lingual prompt capability utilizing VU/PEP, alterations of the functional code, call flow and programmatic logic of the Network Application as well as the PEP code are required for each language.

As discussed above, VU/PEP utilizes an embedded dynamic data processor for the expansion of dynamic data for a limited set of dynamic data types. Modifications to the Network Application and PEP would be required to play prompts utilizing a different dynamic element type. In addition, the format of the SP and/or ESP commands would have to be enhanced to provide for the new type of dynamic data. For example, if it were desired to play prompts with monetary values, a change to the SP or ESP command would be required to support the new type of dynamic data. In addition, alterations to the dynamic data processor embedded in PEP would also be required to support the new dynamic element type. Not only would this arrangement require alteration of the Network Application and PEP code, but it would also be extremely limited in flexibility. Additionally, a multi-lingual capability with respect to the special dynamic element types would further exacerbate the difficulties.

SUMMARY OF THE INVENTION

The above disadvantages of the prior art are overcome by a new Prompt Management System for NAP that provides multi-lingual capability for the prompts of a Network Application without the necessity of significant Network Application programming changes or modifications to the PEP. The Prompt Management System of the present invention comprises a Speech Interface to NAP (SPIN) in combination with the Prompt Expansion Processor (PEP) with a Modular Dynamic Data Processor (MDDP). The Prompt Management System of the present invention is referred to as SPIN/PEP.

SPIN is a program used through NAP on behalf of a Network Application to create or modify the prompts and the elements of the prompts to be played by the Network Application in a predetermined spoken language. The elements of the prompts are ordered in accordance with the syntax, grammar and phraseology of the particular spoken language. The voice for the elements can be recorded through NAP and stored in the NAP voice file. The NAP Message IDs corresponding to the recorded voice elements are stored in a SPIN Data Base (SPINDB). The SPIN user creates or modifies a Dynamic Element Table containing ordered lists of logically grouped dynamic elements required for the prompts of the Network Application. The MDDP defines the order and manner in which dynamic data within a dynamic element is spoken in accordance with the syntax, grammar and phraseology of the particular spoken language. The created or modified prompt, element, voice, Dynamic Element Table and MDDP information set for a spoken language is denoted as a SPIN application for the particular spoken language. The SPIN user can copy and modify an existing SPIN application for one spoken language to provide another SPIN application for another spoken language. The SPIN application is created or modified by the user utilizing interactive SPIN screens.

The Network Application issues a PEP command to send a prompt, e.g., an Enhanced Send Prompt (ESP) command or an Enhanced Multi-Send Prompt (EMSP) command, to PEP for expansion, the command designating the ID of the SPIN application to be utilized, the prompt to be played and the specific dynamic data to be utilized. The PEP, using the designated SPIN application information, expands the prompt into its static and dynamic elements converting the static elements into the corresponding NAP Message IDs. The dynamic data is sent to the MDDP which in combination with the Dynamic Element Table expands the dynamic elements into the corresponding NAP Message IDs. The PEP returns an ordered list of the NAP Message IDs which are used in a NAP Send Voice Message command to play the prompt over the telephone.

In addition to standard dynamic element types, the user can create user-defined dynamic element types for enhanced flexibility. The MDDP and Dynamic Element Table is enhanced to support the user-defined dynamic element types.

A SPIN Prompt Processing Screen includes a Dynamic Data Location field for modifying dynamic data usage with respect to the order in which the dynamic data is presented in the PEP command. A Dynamic Element Subtype field can be used to vary how the data for the dynamic element is played. The MDDP is modified to support the Dynamic Element Subtype.

The present invention, therefore, permits a Network Application to play a designated prompt in a selectable spoken language without altering the functional code of the Network Application nor the operational code of the underlying PEP. The Network Applications share the same PEP.

BRIEF DESCRIPTION OF THE DRAWINGS

FIG. 3 is a diagram schematically illustrating further details of the organization of a SPIN application.

FIGS. 5A–5D and 5D1 are diagrams schematically illustrating the organization of information in the cache tables of a SPIN application as illustrated in FIG. 4. Similar information groupings are utilized in the SPINDB of FIG. 4 with respect to the records thereof.

FIG. 6 is a chart illustrating the components and fields of the Enhanced Send Prompt (ESP) command.

FIG. 8 is a representation of the format utilized on SPIN screens generated at the administration terminal of FIG. 4 for user interaction with SPIN.

FIG. 9 is a representation of the SPIN Application Selection screen.

FIG. 10 is a representation of the SPIN Main Menu screen.

FIG. 11 is a representation of the Element Processing screen.

FIG. 12 is a representation of the Prompt Processing screen.

FIG. 13 is a representation of the Prompt Processing screen of FIG. 12 illustrating the creation of a new prompt.

FIG. 14 is a representation of the Modify Items For Prompt screen with the illustrative prompt of FIG. 13 entered therein.

FIG. 15 is a representation of the Modify Items For Prompt screen of FIG. 14 with the illustrative prompt modified with respect to Dynamic Data Location.

FIG. 16 is a representation of the Indexed Prompt Table screen.

FIG. 17 is a representation of the Dynamic Element Table screen with typical Row 9 Element Names entered.

FIGS. 18, 19 and 20 are representations of the Prompt Processing screen of FIG. 12, the Element Processing screen of FIG. 11, and the Dynamic Element Table screen of FIG. 17, respectively, exemplifying the adding of a new user-defined dynamic element type to a SPIN application.

FIG. 21 is a representation of the Transfer screen utilized to transfer selected SPIN application data, or an entire SPIN application, to and from disk files and other SPIN applications.

FIG. 22 is a representation of the Enter Prompts For Transfer screen utilized with the screen of FIG. 21 for transferring a created list of prompts. Comparable screens are utilized for transferring lists of other selected application components.

FIG. 23 is a representation of the Miscellaneous Functions screen for performing such functions as building PEP cache tables.

FIG. 24 is a representation of the Indexed Prompt Table screen of FIG. 16 for establishing the SYSTEM Indexed Prompt Table for the SPIN SYSTEM application.

DESCRIPTION OF THE PREFERRED EMBODIMENT

Figure 1:
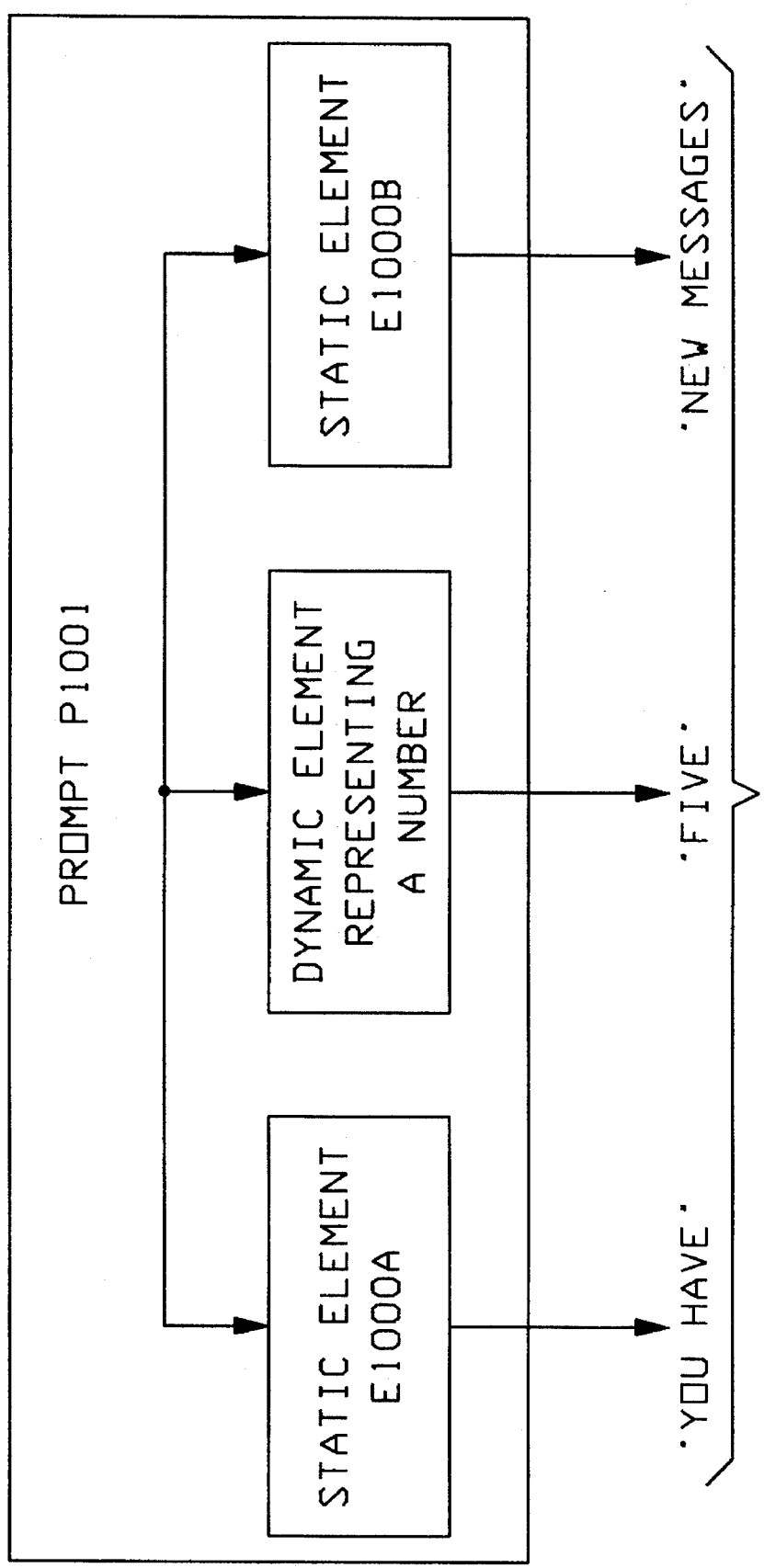
FIG. 1 is a diagram schematically illustrating the anatomy of a prompt.

Referring to FIG. 1, the anatomy of an exemplary prompt P1001 is depicted. The prompt is comprised of a static element E1000A, which has the voice "you have", followed by a dynamic element of dynamic element type 3 representing a number, followed by a static element E1000B with voice "new messages". The prompt definition or mapping is P1001=E1000A, <DYN3>, E1000B. The prompt P1001 was created by SPIN for a SPIN application on behalf of a Network Application. The Network Application invokes playing of the prompt by issuing an ESP or EMSP command naming the SPIN application, the prompt name P1001 and the appropriate dynamic data applicable to the run time. If there were five new messages in the mailbox at run time, the prompt would play "you have five new messages".

The preferred embodiment of the invention supports nine standard dynamic element types as follows: DYN0= Message ID; DYN1=Time/Date; DYN2=Text Locator; DYN3= Cardinal Number; DYN4=Digit String; DYN5=Phone Number; DYN6=Money; DYN7=Alphanumeric; DYN8= Element Name. Dynamic element types 0, 2 and 8 are processed by an internal Dynamic Data Processor within PEP and the dynamic element types 1, and 3–7 are managed by an external Modular Dynamic Data Processor (MDDP) in a manner to be described. The preferred embodiment also supports user-defined dynamic element types denoted as DYN100–DYN999 which requires a custom MDDP in a manner to be further explained.

Another exemplary prompt may be created similar to the prompt P1001 except that static element E1000B would have the voice "messages". A further dynamic element would be inserted between the dynamic element representing a number and static element E1000B to provide a variable adjective for the phrase "messages" such as "new", "urgent", or "saved". This element can be of dynamic element type DYN0, DYN2, or DYN8.

The SPIN component of SPIN/PEP provides for the creation and modification of prompts, elements, Dynamic Element Tables, and Indexed Prompt Tables in SPINDB. SPIN also provides for the creation and modification of voice messages in the Voice File and the related Message IDs in the VIODB. The voice messages corresponding to the elements are recorded into the Voice File with either a neutral, rising, or falling inflection as appropriate. A SPIN application includes a collection of the prompts, elements, voice, Dynamic Element Table, and Indexed Prompt Table created using SPIN plus the associated MDDP. SPIN relates the entities that it creates in the SPIN data base to a particular SPIN application. A SPIN application owns the prompts it creates. These prompts are not shared among SPIN applications. A Network Application uses SPIN applications to play the voice prompts of the Network Application. SPIN applications are created by the implementer of a Network Application to play their prompts. A single Network Application can access multiple SPIN applications and multiple Network Applications can access the same SPIN application.

Figure 2:
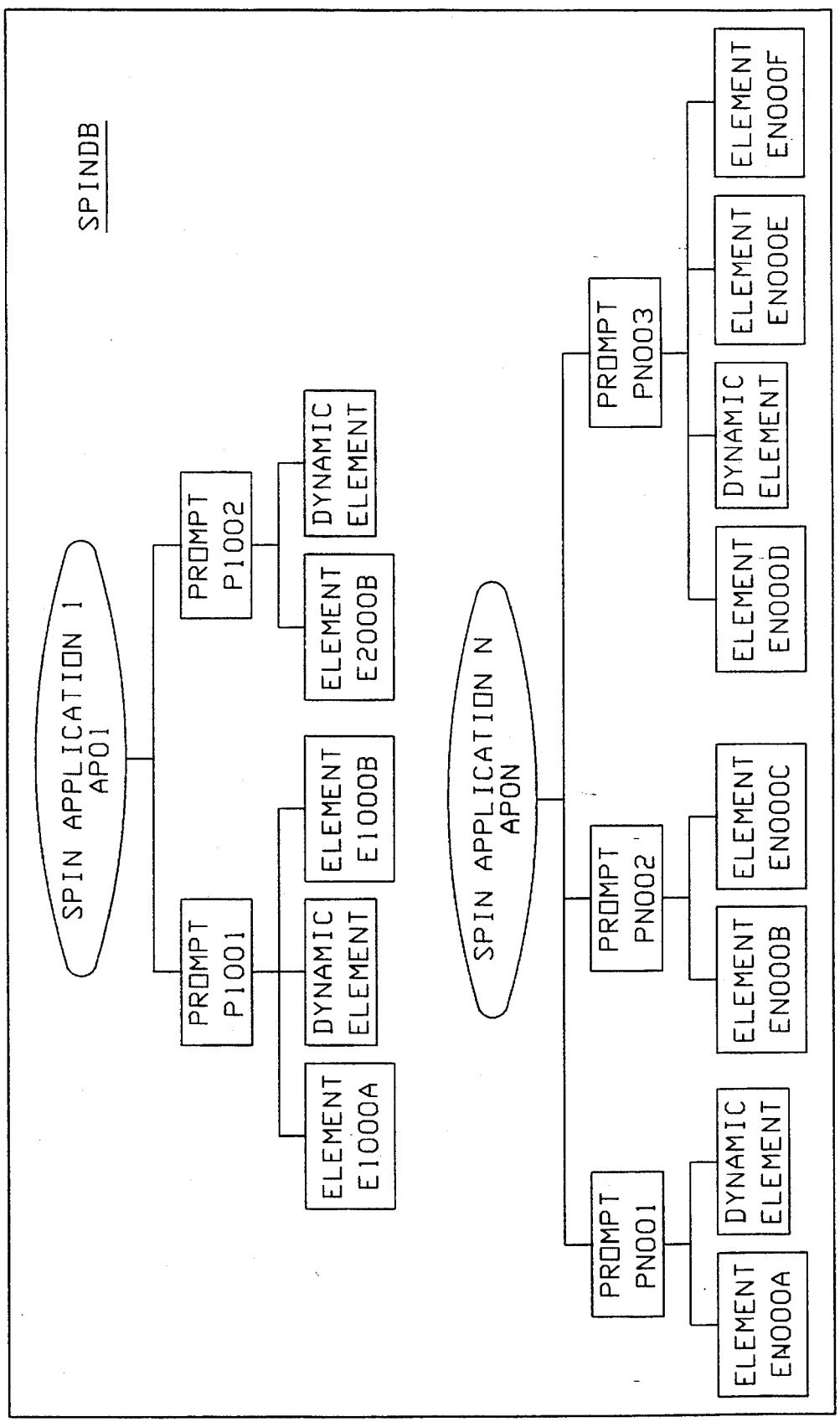
FIG. 2 is a diagram schematically illustrating the organization of SPIN applications within the SPINDB.

Referring to FIG. 2, the organization of SPIN applications within SPINDB is illustrated. This multiple SPIN application organization provides a multi-lingual capability to a Network Application in playing its prompts. For example, a Network Application named Voice Messaging System (VMS) could organize its prompts, elements, voice, Dynamic Element Tables, and Index Prompt Tables under three different SPIN applications (VMSENG, VMSFR, VMSSP) to support three different languages. Each SPIN application identifies and defines the same prompts and related information in a different language. VMS can then play the same prompt in any of the three languages by specifying the appropriate SPIN application when requesting the expansion of the prompt.

Referring to FIG. 3, further details of the organization of a SPIN application are illustrated. A SPIN Application Table 1 lists the SPIN applications created on behalf of a Network Application. As exemplified, the SPIN applications are utilized to speak the prompts of the Network Application in American English, Spanish, Dutch and French, respectively. An American English Prompt Set 2 lists the prompts of the American English SPIN application UV10AE. A Prompt Definition Table 3 illustrates the definition or mapping for the prompt P1000 which has two dynamic elements <DYN3> and <DYNI>. The SPIN application UV10AE utilizes American English MDDP 4 together with American English Dynamic Element Table 5 in the expansion of the dynamic data.

When the Network Application desires to play prompt P1000 in American English, the Network Application issues an ESP or EMSP command identifying SPIN application UV10AE and prompt P1000 and providing the run time dynamic data for the <DYN3> and <DYNI> dynamic elements. The cardinal number dynamic element is expanded utilizing the MDDP DYN3 procedure together with the Dynamic Element Table 5. The date and time dynamic element is expanded utilizing the MDDP DYN1 procedure together with the Dynamic Element Table 5.

If, however, the Network Application desired to play prompt P1000 in Spanish, the Network Application would issue the ESP or EMSP command naming SPIN application UV10SP and prompt P1000, and the dynamic data would be designated in the command in the same format as for the American English prompt. The voice for the elements owned by the SPIN application would, however, be recorded in Spanish. The prompt definition comparable to table 3 would point to these Spanish voice messages but the elements may be reordered or modified to account for language differences. Additionally, dynamic data usage may be reordered in accordance with Spanish requirements. The Spanish MDDP comparable to the MDDP 5 would include procedures to speak the dynamic data elements accounting for syntactical and grammatic requirements of the Spanish language. Gender agreement between dynamic and static elements would also be accounted for in the MDDP procedures using subtypes.

Figure 4A:
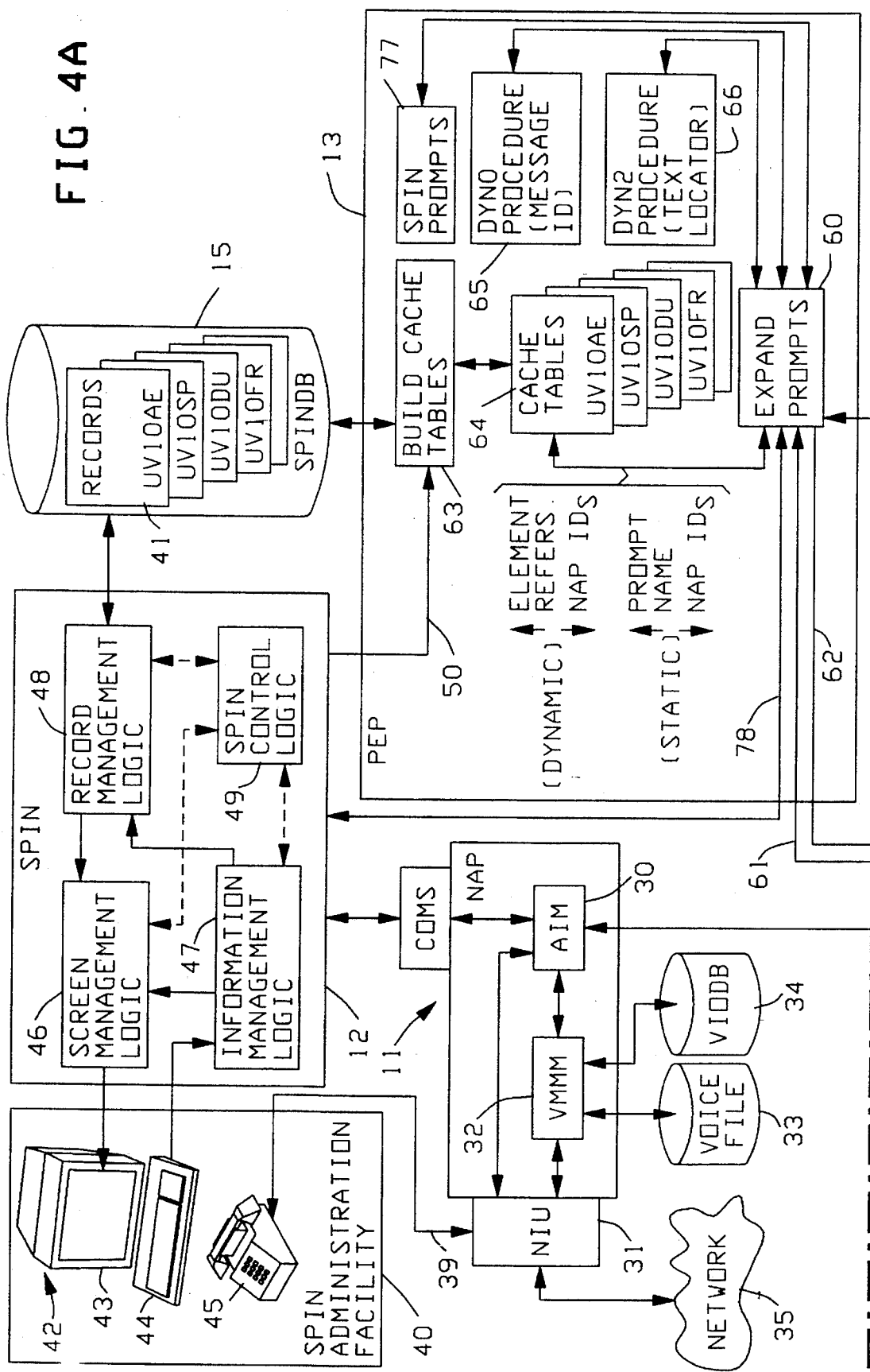
FIG. 4–4B is a schematic block diagram illustrating the multi-lingual prompt management system of the present invention.
Figures 4, 4B:
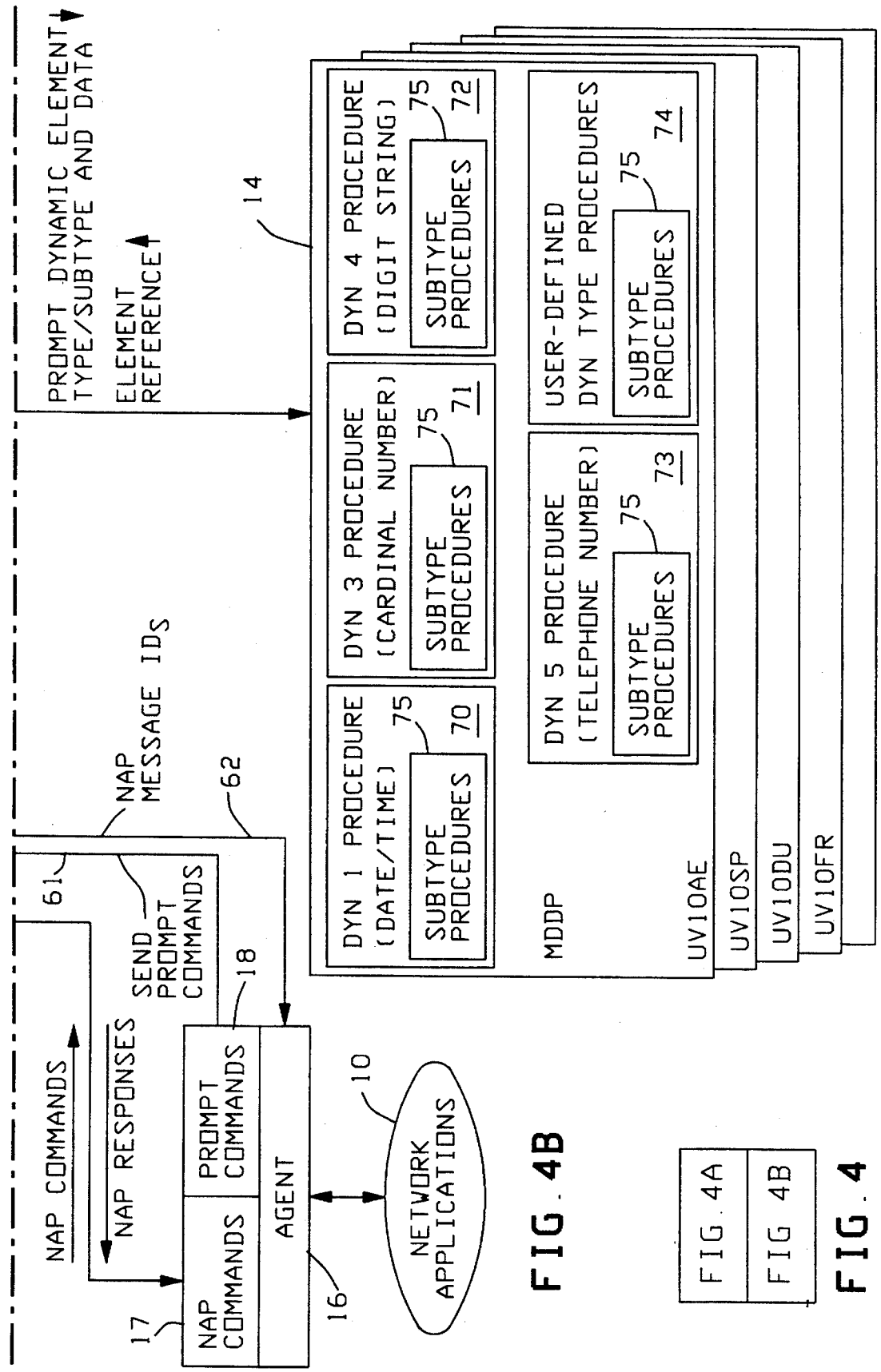

Referring to FIG. 4, a schematic block diagram of the prompt management system of the present invention is illustrated. The prompt management system of FIG. 4 provides support for the creation and playing of prompts on behalf of Network Applications 10 deployed on a NAP system 11. The prompt management system of FIG. 4 includes a SPIN component 12, a PEP component 13 and an MDDP component 14. Prompt information is recorded and stored in a SPINDB 15. As previously defined, SPIN represents Speech Interface to NAP; PEP represents Prompt Expansion Processor; MDDP represents Modular Dynamic Data Processor; and SPINDB represents SPIN Data Base.

The Network Applications 10 communicate with NAP 11 through an agent 16 and also utilizes the agent 16 to communicate with PEP 13. As described in said Patent No. 5,133,004, the Network Applications 10 command the NAP 11 via AIM commands to perform the functionality required by the Network Applications. The agent 16 directs the AIM commands to NAP 11 via logic 17. When a Network Application 10 requires that a prompt be played, the Network Application issues a PEP command to the agent 16. The agent 16 directs PEP commands to the PEP 13 via logic 18. SPIN 12 communicates with NAP 11 through a Communication Management System (COMS) 19. It is appreciated that SPIN 12 is an application to NAP 11 communicating through COMS 19 in the manner described in said Patent No. 5,133,004.

Although NAP 11 is described in detail in said Patent No. 5,133,004, the following explanation is provided for continuity herein. NAP 11 includes an Application Interface Module (AIM) 30 which is the central communication module of NAP. SPIN 12 communicates with AIM 30 through COMS 19. The Network Applications 10 communicate directly with AIM 30 via the agent 16. The playing of prompts commanded by the Network Applications 10, as expanded by PEP 13, is also effected through NAP 11 via the AIM 30 in a manner to be described. The NAP 11 also includes a Network Interface Unit (NIU) 31 that provides the interface for NAP 11 to the telephone network 35. The NIU 31 effects call switching under control of applications communicating with NAP 11 through AIM 30.

The NAP 11 includes a Voice Message Management Module (VMMM) 32, a Voice File 33 and a Voice Input/Output Data Base (VIODB) 34. The VMMM 32, in response to commands received through AIM 30, sends identified voice messages stored in the Voice File 33 over a telephone connection effected through the NIU 31 and receives voice messages from a telephone connection established through the NIU 31 for storage in the Voice File 33. VMMM 32 assigns NAP Message IDs to received and recorded voice messages and via AIM 30 returns these voice Message IDs to the application involved in the telephone call. The NAP Message IDs corresponding to the messages stored in the Voice File 33 are maintained in the VIODB 34 for accessing the messages. Each voice message stored in the Voice File 33 has a unique NAP Message ID associated therewith. Details of the VMMM 32, Voice File 33 and VIODB 34 can be found in said Patent No. 5,133,004 and further details can be found in U.S. Pat. No. 5,138,710, issued Aug. 11, 1992. Said Patent No. 5,138,710 is incorporated herein by reference in its entirety.

The SPIN 12, in combination with a SPIN Administration Facility 40, creates and modifies prompts, prompt elements, Dynamic Element Tables and Indexed Prompt Tables, and stores the information in records 41 in SPINDB 15. SPIN 12 uses NAP 11 and the SPIN Administration Facility 40 to record the voice for each of the static and dynamic elements. The voice for each element is stored in Voice File 33 and NAP 11 returns to SPIN 12 a unique NAP Message ID for each recorded voice message corresponding to an element. SPIN 12 stores the NAP Message ID corresponding to an element with the element record in SPINDB 15. A collection of prompts, elements, element voice in Voice File 33, Dynamic Element Table, Indexed Prompt Table, related information and an MDDP 14 for processing dynamic data—all for a particular spoken language—is denoted as a SPIN application or information set. The records 41 in SPINDB 15, as well as the MDDP 14, are illustrated exemplifying the four SPIN applications named in table 1 of FIG. 3 for selectively playing the prompts either in American English, Spanish, Dutch or French.

The SPIN Administration Facility 40 includes an administration terminal 42 comprised of a monitor display 43 and a keyboard 44 for information entry. The SPIN Administration Facility 40 also includes a telephone 45 for verbal communication, via a link 39, with a SPIN 12 terminal session via NAP 11 by a dial-up procedure to be described. SPIN 12 includes Screen Management Logic 46 for generating screens, to be described, on the monitor 43 for the interactive inputting of the information for the SPIN applications via the keyboard 44. SPIN 12 also includes Information Management Logic 47 for managing the information entered via the keyboard 44. Record Management Logic 48 receives the inputted information from Information Management Logic 47 formatting appropriate records 41 for the information for storage in the SPINDB 15. SPIN Control Logic 49 controls the logic 46–48 to perform the functionality of SPIN 12 in a manner to be described. The control of the functionality of logic blocks 46–48 by the SPIN Control Logic 49 is schematically represented by dashed interconnecting lines.

The PEP 13 expands a prompt commanded by a Network Application 10 into the appropriate sequence of NAP Message IDs for speaking the prompt. The PEP 13 includes an Expand Prompts block 60 that receives an ESP or EMSP command from the agent 16 on a path 61 and returns the corresponding sequence of NAP Message IDs to the agent 16 on a path 62. The PEP 13 includes a Build Cache Tables block 63 for building cache tables 64 from the SPINDB 15 for rapid retrieval of information. Build Cache Tables block 63 constructs a set of cache tables 64 for each of the SPIN applications in the records 41 of SPINDB 15. The Build Cache Tables function can be initiated for a SPIN application by PEP when it initializes, or by the user via path 50, or by default via path 61 if the tables have not yet been built. Expand Prompts 60 accesses the cache tables 64 for constructing the sequence of NAP Message IDs on the path 62 in response to the ESP or EMSP commands on the path 61.

PEP 13 also includes an internal Dynamic Data Processor comprising blocks 65 and 66. Block 65 is utilized by Expand Prompts 60 for expanding dynamic data of dynamic element type 0 (DYN0). Similarly, block 66 is utilized by Expand Prompts 60 for expanding dynamic data of type DYN2. The DYN0 procedure 65 identifies a textual dynamic element directly by its NAP Message ID. The DYN2 procedure 66 identifies a textual dynamic element by its associated text locator in a manner to be explained. It is appreciated that a further internal dynamic processor (not shown) can be incorporated in PEP 13 for processing dynamic element type 8 (DYN8) for Element Name. The DYN8 procedure would locate the named element in the appropriate cache table and provide the NAP Message ID corresponding thereto.

The MDDP 14 includes procedures denoted by reference numerals 70–75 for expanding dynamic data received in a prompt command with respect to various dynamic element types and subtypes. Procedure 70 expands DYN1 type dynamic data for date/time. Procedure 71 expands DYN3 type dynamic data for cardinal numbers. Procedure 72 expands DYN4 type dynamic data for Digit Strings. Procedure 73 expands DYN5 type dynamic data for telephone numbers. Procedures 74 expand dynamic data of user-defined dynamic types. MDDP 14 also includes additional procedures (not shown) for dynamic element types DYN6 and DYN7 for expanding dynamic data in a Money or in an Alphanumeric format, respectively. Routines within these procedures can expand dynamic data with respect to dynamic element subtypes as schematically represented by reference numeral 75.

In a manner to be described, the MDDP DYN procedures expand dynamic data into a series of element references that are returned to the Expand Prompts block 60 of PEP 13. Expand Prompts 60 uses each element reference to retrieve the associated NAP Message ID from the cached Dynamic Element Table in the cache tables 64 for the associated SPIN application.

As indicated in FIG. 4, there are a plurality of MDDPs 14 corresponding to the plurality of SPIN applications, respectively, each SPIN application having its own MDDP. Thus, the procedures of an MDDP are constructed in accordance with the format for the dynamic data types and subtypes with respect to the spoken language for which the SPIN application is constructed.

The PEP 13 includes a block 77 schematically representative of the prompts required by SPIN 12 in managing the SPIN applications. In a manner to be explained, a user effects a telephone connection with SPIN 12 via telephone 45 with respect to the user's session of terminal 42 and SPIN 12 prompts the user through the prompt management procedure. The SPIN prompts block 77 schematically represents this process. It is appreciated, however, that the SPIN prompts played over the telephone 45 are controlled in the same manner as prompts played on behalf of the Network Applications 10. SPIN 12 controls the playing of the SPIN prompts by a path 78 between SPIN 12 and the Expand Prompts block 60.

Referring to FIGS. 5A–5D and 5D1, with continued reference to FIG. 4, the cache tables 64 are schematically illustrated. The information for these tables is extracted by Build Cache Tables 63 from the records 41 of SPINDB 15. The records 41 are, however, formatted differently from the cache tables 64 to facilitate data base access by Build Cache Tables 63. Each SPIN application has its own set of cache tables.

Referring to FIG. 5A, the organization of the cache Element Table 80 is illustrated. Every static and dynamic element of a SPIN application is recorded in table 80. The element name, the element text locator, and the corresponding NAP Message IDs are recorded for each element. The NAP Message IDs point to the recorded voice for the element in Voice File 33 for neutral, rising and falling voice inflection, respectively. For example, element #0 which speaks the number "zero" has an assigned text locator of ZERO with the neutral inflection, rising inflection and falling inflection voice for the number potentially stored in NAP 11 as identified by the listed NAP Message IDs. It is appreciated that only those inflections actually used are recorded and stored. In a manner to be later described, the voice(s) for element #0 are interactively recorded utilizing SPIN 12, NAP 11 and the SPIN Administration Facility 40. In the creation process, NAP 11 returns the NAP Message IDs to SPIN 12 for the voice recorded via the telephone 45.

Referring to FIG. 5B, the organization of Prompt Table 81 is illustrated. Table 81 contains the prompt mapping for every prompt controlled by a SPIN application. For example, prompt P1000, discussed above with respect to FIG. 3, is illustrated. Although the records 41 of SPINDB 15 record the prompts utilizing static element names, it is appreciated that Build Cache Tables 63 substitutes the associated NAP Message IDs from table 80 for the static element names in table 81. The dynamic elements in table 81 are denoted by the dynamic element type as illustrated.

Referring to FIG. 5C, the organization of the Indexed Prompt Table 82 is illustrated. The Indexed Prompt Table 82 provides a fast access path for PEP 13 for expanding frequently used prompts. The PEP 13 can locate the prompts in its cache tables 64 by index number faster than it can access prompts by prompt name. Accordingly, the table 82 lists, by associated entry indices, the NAP Message IDs and <DYN> types for frequently used prompts. The prompts are mapped in the table 82 in the manner explained above with respect to the table 81.

Referring to FIGS. 5D and 5D1, the organization of the Dynamic Element Table 83 is illustrated. FIG. 5D depicts the table 83 in list format, whereas FIG. 5D1 depicts the table in row, column coordinate format. In FIG. 5D, the information listed in the Voice and Inflection columns are not actually in the table but are included in the figure for clarity. It is appreciated that FIGS. 5D and 5D1 represent the SPINDB version of the Dynamic Element Table. As described above, Message IDs are used in the cached table in place of the Element Names.

The Dynamic Element Table contains ordered lists of logically grouped elements used by the MDDP 14 for processing dynamic data supplied by a Network Application. Table values are stored in SPINDB 15 which provide PEP 13 and the MDDP 14 with the information needed to support standard and user-defined dynamic element types. SPIN 12 creates or modifies the Dynamic Element Table for a SPIN application and each SPIN application uses only one Dynamic Element Table to expand prompts containing dynamic elements. Dynamic data provided by the Network Application 10, together with the dynamic elements in a prompt, are utilized to play voice that varies each time the prompt is played. The PEP 13 processes dynamic data using the Dynamic Element Table and MDDP 14 of the SPIN application.

The Dynamic Element Table maps elements by rows and index number. Rows comprise logically related elements, such as days of the week or Cardinal Numbers. Rows are identified by number and, optionally, by a name. Each element in a row has a unique index number. A row number and an index number together provide an element reference that identifies a specific element in the table. Knowledge of a SPIN application's Dynamic Element Table is coded into the logic of the DYN procedures of its MDDP in order to properly expand the Network Application's dynamic data. This knowledge includes the correlation between the element references and the dynamic elements of the Dynamic Element Table.

Values in any of the rows can be used for any dynamic element type. For example, dynamic element type 1, Date and Time, uses elements from the row containing days of the week, the row containing months of the year, and the rows containing cardinal and ordinal numbers. Dynamic element type 3, Cardinal Number, uses the rows containing cardinal numbers and large cardinal numbers.

The Dynamic Element Table illustrated in FIG. 5D includes the following rows: Row 1 CARD (cardinal numbers); Row 2 DTTIME (years, and minutes for time of day); Row 3 AMPM (elements to follow time of day, such as "midnight, and "AM"); Row 4 DIGITN (digits recorded with neutral inflection); Row 5 DIGITF (digits recorded with falling inflection); Row 6 DAYS (days of the week); Row 7 MONTHS (months of the year); Row 80RDNAL (ordinal numbers, up to thirty-first); Row 9 LGCARD (large cardinal numbers, such as hundred, thousand, million).

When SPIN 12 constructs the Dynamic Element Tables in the records 41 of SPINDB 15, the element names are utilized in the records. When Build Cache Tables 63 constructs the cached Dynamic Element Tables 64, the element names are replaced with the corresponding NAP Message IDs from Element Table 80.

In FIG. 5D1, the coordinates row 1 and index number 3 identify element #3, which has the recorded voice "three". Row 2 and index number 5 identify element #05, which has the recorded voice "oh five". Row 1 (CARD) contains the elements required to play cardinal numbers, row 2 (DTTIME) contains the elements required to play the minutes for date and time, and row 9 (LGCARD) contains the elements required to play large cardinal numbers, such as "million," and "billion".

When expanding dynamic data in a prompt command, the MDDP 14 utilizes the appropriate procedure in accordance with the dynamic element type and returns a sequence of element references (row number, index number coordinates) of the associated Dynamic Element Table to PEP 13. PEP converts the element references to NAP Message IDs using the cached Dynamic Element Table. The DYN procedures of the MDDP 14 contain knowledge of the conversion between dynamic elements stored in the Dynamic Element Table and the corresponding element references. For example, the Dynamic Element Table of FIG. 5D is constructed with row #6 containing the days of the week, starting with the element for Monday and ending with the element for Sunday. The MDDP procedure for Date and Time would then reference row #6 in the Dynamic Element Table with an index of zero (0) to play Monday, an index of one (1) to play Tuesday, etc. Another somewhat different arrangement for a Dynamic Element Table is illustrated by reference numeral 5 in FIG. 3.

With continued reference to FIG. 4, a Network Application 10 uses PEP commands to request the playing of prompts and to supply any dynamic data required by a prompt. A PEP command from a Network Application 10 is intercepted by the agent 16 and passed to PEP 13 along a path 61 for expansion. PEP 13 returns an ordered list of NAP Message IDs on a path 62 required to play voice for the requested prompt. The agent 16 then constructs and submits a NAP Send Voice Message command with the ordered list of Message IDs to NAP. NAP retrieves the digitized voice corresponding to each Message ID from the Voice File 33 and plays it over the telephone connection established for the requesting Network Application.

PEP commands include the Enhanced Send Prompt command (ESP) and the Enhanced Multi-Send Prompt command (EMSP). ESP is of NAP Message Type 302 and EMSP is of NAP Message Type 303. The ESP is utilized by Network Applications 10 to request NAP 11 to play one prompt over the established telephone connection. The name of the prompt to be played, the SPIN application ID that owns the prompt and any dynamic data required by the prompt are contained in the body of the command. Dynamic data for dynamic element types Message ID, date/time, text locator, cardinal number, digit string and phone number can be supplied in limited number (2 or 3).

The EMSP command is utilized by Network Applications 10 to play one or more prompts over the established telephone connection. The command contains the SPIN application ID that owns the prompts and the body of the command contains the name of each prompt to be played followed by any dynamic data required by the prompt. Dynamic data for dynamic element types Message ID, date/time, text locator, cardinal number, digit string, money, alphanumeric, element name and any user-defined types can be supplied in any number (not to exceed the maximum command length).

The ESP command and the EMSP command are comprised of a command header and a command body. The header is the same as that disclosed in said Patent No. 5,133,004 as the AIM command header.

Referring to FIG. 6, with continued reference to FIG. 4, the format of the ESP command is illustrated. The ESP command comprises the NAP AIM command header 90 including Message Type field 91. The remainder of the command comprises the command body 92.

The body 92 of the ESP command includes a "SPIN Application ID" field 93 that specifies the name of the SPIN application that owns the prompt requested by the command. The body 92 further includes a "Prompt ID" field 94 that specifies the name of the prompt to be played. A "Message ID 1" field provides dynamic data for dynamic element type 0, Message ID. This field provides the NAP Message ID of the voice to be played whenever the prompt mapping specifies the dynamic element type 0. Three NAP Message IDs can be included in a single prompt. The "Message ID 2" and "Message ID 3" fields support the second and third occurrence of dynamic element type 0. The "Message ID" fields are generally utilized to speak user-recorded information, such as the user's recorded name or personal greeting. The dynamic data in the "Message ID" fields of the ESP command are processed by the DYN0 procedure 65 of PEP 13. The NAP Message ID specified in the command is simply placed into the output buffer of Expand Prompts 60.

A "Date and Time 1" field provides dynamic data for dynamic element type 1, date and time. This field provides the date and/or time to be played whenever the prompt mapping specifies dynamic element type 1. The format of the field is HHMMSSTTMMDDYY. As is appreciated, this format designates Hours, Minutes, Seconds, Tenths of Seconds (not used), Month, Day, Year. To play dates or times separately (MMDDYY or HHMMSSTT), zeros or blanks are inserted into unused positions. Three date/time elements can be included in a single prompt and fields "Date and Time 2" and "Date and Time 3" are utilized for this purpose to support the second and third occurrence of dynamic element type 1. The date and time dynamic data is expanded by the DYN1 procedure 70 of MDDP 14 in a manner to be described.

A "Text 1" field provides dynamic data for dynamic element type 2, text locator. This field supplies the text locator of the element to be played whenever the prompt mapping specifies dynamic element type 2. Three text locators can be included in a single prompt with the "Text 2" field and "Text 3" field utilized for this purpose. The DYN2 procedure 66 of PEP 13 is utilized to expand the dynamic element type 2 data. The text locator is readily translated to NAP Message ID utilizing element table 80 of FIG. 5A. The neutral inflection voice element is utilized in the expansion of dynamic element type 2.

A "Cardinal Number 1" field provides dynamic data for dynamic element type 3, cardinal number. This field supplies the number to be played, from 1 through 99, whenever the prompt mapping specifies dynamic element type 3. Three cardinal numbers can be specified for a single prompt with the "Cardinal Number 2" field and "Cardinal Number 3" field utilized for this purpose. The cardinal number dynamic data is expanded utilizing the DYN3 procedure 71 of the MDDP 14 in a manner to be described.

A "Digit String 1" field provides dynamic data for dynamic element type 4, digit string. This field provides the string of digits to be played whenever the prompt mapping specifies dynamic element type 4. Values in this field can include digits zero through nine, A through D, pound (#), and star (*). A maximum of 20 digits can be specified. Two digit strings can be specified for a single prompt. The "Digit String 2" field is utilized for this purpose. The digit string dynamic data is expanded by the DYN4 procedure 72 of the MDDP 14 in a manner to be described.

A "Phone Number 1" field provides dynamic data for dynamic element type 5, telephone number. This field provides the telephone number to be played whenever the prompt mapping specifies dynamic element type 5. Values in this field can include the digits zero through nine. A maximum of 20 digits can be specified. Two telephone numbers can be specified for a single prompt with the "Phone Number 2" field utilized for this purpose. The phone number dynamic data is expanded using the DYN5 procedure 73 of the MDDP 14 in a manner to be described.

Figure 7:
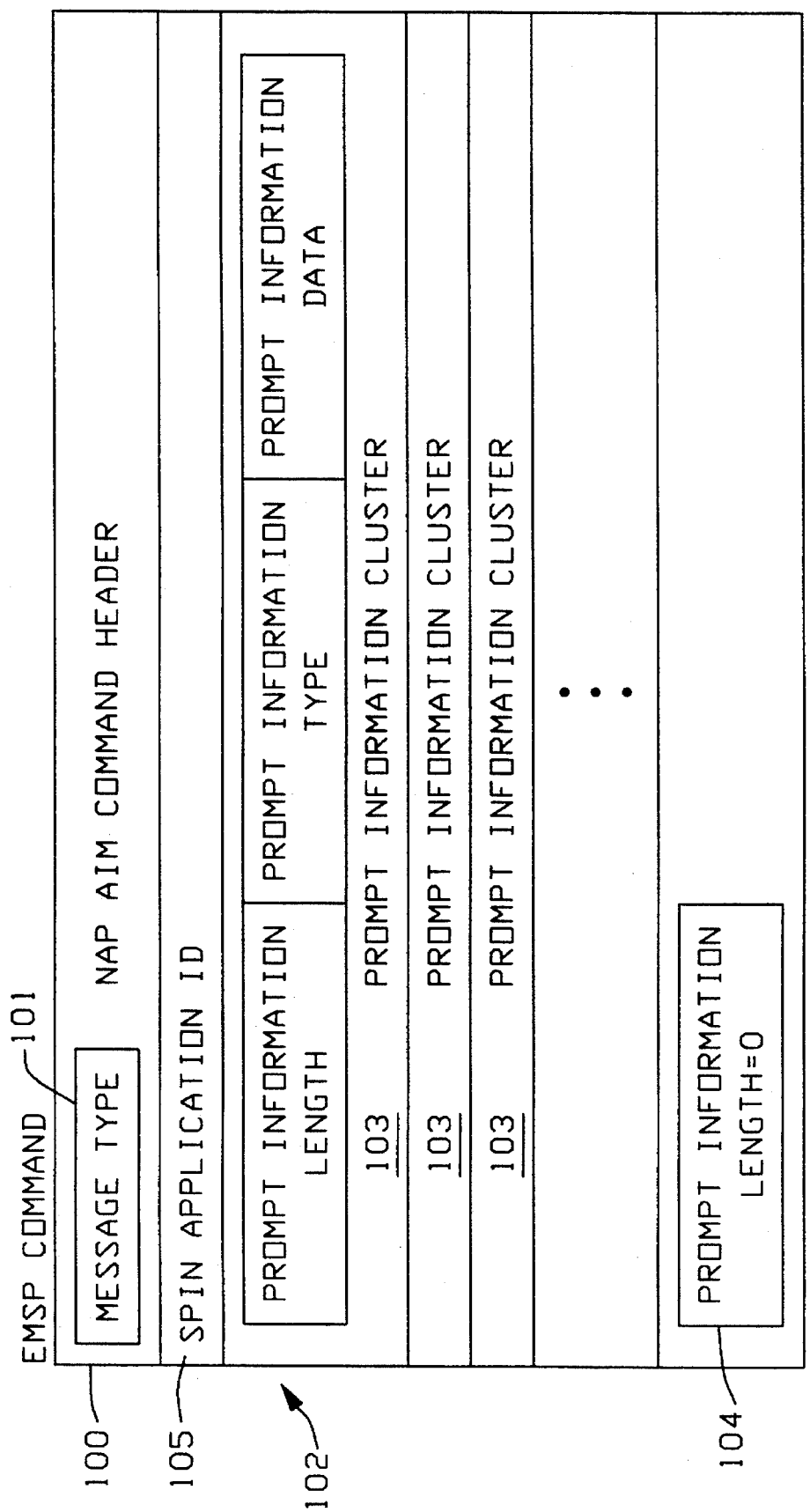
FIG. 7 is a chart illustrating the components and fields of the Enhanced Multi-Send Prompt (EMSP) command.

Referring to FIG. 7 with continued reference to FIG. 4, the format of the EMSP command is illustrated. The EMSP command includes a NAP AIM command header 100 similar to that described above with respect to the ESP command of FIG. 6. The header 100 includes a Message Type field 101 for designating the command Message Type. The remainder of the command comprises the command body 102. The command body includes "Spin Application ID" field 105 for specifying the name of the SPIN application that owns the prompts requested by the command. The command body further includes Prompt Information Clusters 103 that are repeated in sets for each prompt to be played, up to a maximum command length of 500 bytes.

The Prompt Information Cluster 103 consists of three consecutive fields denoted as Prompt Information Length (PIL), Prompt Information Type (PIT), and Prompt Information Data (PID). The Prompt Information Cluster 103 contains either a prompt request or dynamic data as designated by the PIT field. A prompt that requires dynamic data is specified utilizing multiple Prompt Information Clusters. The first cluster is the prompt request cluster followed by each dynamic data cluster required for the prompt, in the order in which the dynamic data is to be played. The PIL field specifies the length of the Prompt Information Cluster, including the PIL, PIT, and PID fields. As indicated by reference numeral 104, the end of the command is marked by specifying a PIL of zero.

The PIT field specifies the type of data contained in the current PID field of the Prompt Information Cluster. The data can be a prompt request or a dynamic data request. PIT values include:
000=Message ID
001=Date and Time
002=Text Locator
003=Cardinal Number
004=Digit String
005=Phone Number
006=Money
007=Alphanumeric
008=Element Name
009–0097=Values Reserved For SPIN/PEP
098=Prompt Index Value
099=Prompt Name
100–999=User-Defined Dynamic Element Types.

It is appreciated that for PIT values 000 through 008 the numerical value is the same as the corresponding dynamic element type. If the PIT field contains 000 through 008 or 100 through 999, the PID field contains the dynamic data to be played for the dynamic element type. If the PIT field contains 098 or 099, the PID field contains the index number or name, respectively, of the next prompt to be played.

The PID field provides appropriate prompt dynamic data or information for the PIT value as follows.

For PIT =000, <DYN0>, PID contains the Message ID of the voice to be played. The comments made above with respect to the ESP command, Message ID field, apply except that PID contains data for only one dynamic element.

For PIT=001, <DYN1>, PID contains the date and/or time to be played. The format is HHMMSSTTMMDDYY. To play a time (HHMMSSTT) or a date (MMDDYY) separately, zeros or blanks are inserted into the unused portions. The comments made above with respect to the ESP command, Date and Time field, apply except that PID contains data for only one element.

For PIT 002, <DYN2>, PID contains the text locator of the element to be played. The comments made above with respect to the ESP command, Text field, apply except that PID contains data for only one element.

For PIT=003, <DYN3>, PID contains the cardinal number to be played. The comments made above with respect to the ESP command, Cardinal Number field, apply except that PID contains data for only one element.

For PIT=004, <DYN4>, PID contains the digit string to be played. The comments made above with respect to the ESP command, Digit String field, apply except that PID contains data for only one dynamic element.

For PIT=005, <DYN5>, PID contains the phone number to be played. The comments made above with respect to the ESP command, Phone Number field, apply except that PID contains data for only one dynamic element.

For PIT=006, <DYN6>, PID contains a money value to be played. The last two characters of the PID field represents the "cents" amount to be played and the first characters of PID represent the "dollar" amount to be played. If the last two characters of the money value are both blank, no "cents" are played. MDDP 14 includes a DYN6 procedure (not shown) for expanding the money dynamic element type in this manner.

For PIT=007, <DYN7>, PID contains the alphanumeric characters to be played. Values can include zero through nine, A through Z, pound (#), and star (*). MDDP 14 includes a DYN7 procedure (not shown) for expanding the alphanumeric dynamic element type.

For PIT=008, <DYN8>, PID contains the name of an element to be played. Table 80 of FIG. 5A correlates the element names with the NAP Message IDs that point to the corresponding voice. PEP 13 contains a DYN8 procedure (not shown) for expanding this dynamic element type in a manner similar to that described above for DYN2 procedure.

For PIT=100 through 999, the PID field contains the user-defined dynamic data to be played. The specifics of the dynamic data values are determined by the user. The user defined DYN type procedures 74 of the MDDP 14 are provided to process these dynamic data types.

For PIT=098, PID contains the index number in the Indexed Prompt Table of the next prompt to be played. It is appreciated that clusters following this prompt request cluster will contain the dynamic data therefor, as described above.

For PIT=099, PID contains the name of the next prompt to be played. It is appreciated that clusters following the current prompt request cluster will contain the dynamic data for the prompt, as described above.

With continued reference to FIG. 4, details of a standard MDDP for expanding dynamic elements with respect to American English will now be described. The standard MDDP can be utilized with the Dynamic Element Table illustrated in FIG. 5D for expanding dynamic elements, for an American English SPIN application such as SPIN application UV10AE (MDDP 14).

The DYN1 procedure 70 for Date and Time processes the date and time as follows: Date:

If values for both date and time are provided by the Network Application in the PEP command, the date is played first, then the word "at", and then the time. If the date is today, the word "today" is played instead of the date. If the date is yesterday, the word "yesterday" is played instead of the date. If the date is neither today nor yesterday, the day of the week is played, followed by the name of the month, then the day of the month. For example, "Monday, January 6th". A year between 1921 and 2020 is played if the date is a year or more in the past or in a future calendar year. For example, for today's date of last year, the year is played, whereas for tomorrow's date of last year, the year is not played.

Time:

If time is played following the date, the word "at" is played before the time. For example, "Monday, Jan. 6th, at five oh nine PM". The hour is played first, then the minutes. The time is followed by the words "AM", "PM", "noon", or "midnight". For example, "four oh six PM", or "twelve noon".

The DYN3 procedure 71 processes cardinal numbers as follows:

Plays numbers up to 18 digits long provided by the Network Application in the PEP command grouping digits in sets of three from right to left. Plays words associated with large numbers, from "hundred" to "quadrillion". For example, the number 1,777,468 is played as "one million, seven hundred seventy-seven thousand, four hundred sixty-eight".

The DYN4 procedure 72 processes digit strings as follows:

Plays as many characters as provided by the Network Application in the PEP command. These can include digits zero through nine, A through D (fourth column DTMF digits), #(pound) and * (star). Plays digits one at a time, from left to right. The number 1777468 is played as "one seven seven, seven four six eight". Plays digits with neutral inflection with the following exceptions: plays the last digit with falling inflection; plays every third digit with falling inflection, except for the next to the last digit which is played with neutral inflection.

The DYN5 procedure 73 processes telephone numbers as follows:

Plays telephone numbers provided by the Network Application in the PEP command grouping digits in sets of three from left to right, the last set having four digits. Plays the last digit in each group with falling inflection, playing all other digits with neutral inflection. For groups containing a non-zero digit and two zeros, plays the digit and the word "hundred". For groups containing a non-zero digit and three zeros, plays the digit and the word "thousand".

It is appreciated that similar procedures may be incorporated into the MDDP 14 for dynamic type 6 for Money and dynamic type 7 for Alphanumeric.

The MDDP procedures are described in terms of playing elements. It is appreciated that the procedures utilize knowledge of the Dynamic Element Table of, for example, FIG. 5D to convert the dynamic data to element references (row number, index number) and return appropriately ordered sequences of the element references to PEP 13 in the Expand Prompts process 60.

With continued reference to FIG. 4, SPIN applications are created and modified for playing prompts of a Network Application 10 in various spoken languages. utilizing SPIN 12, SPINDB 15, NAP 11 and the SPIN Administration Facility 40. Screen Management Logic 46 generates screens on the display 43 for the interactive creation and modification of the SPIN applications by entering information to SPIN 12 via the keyboard 44. The telephone 45 is used to record and play voice for the prompts and elements of the SPIN applications via NAP 11. Referring to FIG. 8, the format of SPIN screens is illustrated. The "SCREEN IDENTIFIER" is used with a "GO" command in the Action field to jump immediately to the designated screen. The "SCREEN TITLE" describes the purpose of the screen. The "Action" field accepts input of the first two characters of the action to be performed and the "List Of Available Actions" lists the actions that can be performed with the screen. The "Display fields" displays information which cannot be modified by the user. The "Input fields" accept user input. "APPLICATION" displays the name of the SPIN application onto which the user is logged. "OFFLINE" indicates whether the telephone 45 has been connected to SPIN for recording or playing back messages. OFFLINE indicates that the telephone is not connected to SPIN; ONLINE indicates that it is. "SPIN USER ID" is a unique identifier of a user who calls in to SPIN for voice recording and playback. The following actions can be executed from the Action line of most of the SPIN screens: "HOme" is selected to return to the SPIN Main Menu; "GO <screen identifier>" is selected to display a specific SPIN screen by entering the three-character screen identifier; "? CLOSE" is selected to terminate the current SPIN session.

Referring to FIG. 9, the SPIN APPLICATION SELECTION screen 200 is illustrated. The screen of FIG. 9 is the opening SPIN screen used when first entering SPIN to create or log onto a SPIN application. The screen instructs the user how to process an existing SPIN application or create a new SPIN application. Plural SPIN applications can be created for a Network Application 10 (FIG. 4) to provide multi-lingual capability for the prompts of the Network Application. The SPIN User ID is entered to uniquely identify a user in establishing a telephone connection to SPIN. The "CReate" Action and "Application name" are designated by reference numerals 201 and 202, respectively. Referring to FIG. 10, the SPIN Main Menu screen is illustrated. The SPIN Main Menu screen provides access to all SPIN functions. The main menu selections are illustrated on the screen. The choices are as follows.

The ELE selection permits creating, editing, deleting, viewing, recording or playing back elements in the SPIN application. The ELE screen will be displayed in response to selecting ELE and will be described with respect to FIG. 11.

The PRO selection permits creating, editing, deleting, viewing, or playing back prompts in the SPIN application. The PRO screen will be displayed in response to selecting PRO and will be described with respect to FIG. 12.

The TRA selection permits loading SPIN application information and moving items between SPIN applications. Items can be moved between SPIN applications to facilitate multi-lingual capabilities. The TRA screen will be displayed in response to selecting TRA and will be described with respect to FIG. 21.

The CON selection invokes a CONFIGURE APPLICATION screen (not shown) with an input "MDDP File Name:" for entering the name of the file in which a custom MDDP for the SPIN application can be found.

The DYN selection permits creating, editing, deleting, viewing, or playing back a Dynamic Element Table. The DYN screen will be displayed in response to selecting DYN and will be described with respect to FIG. 17.

The IND selection permits creating, editing, deleting, viewing, or playing back an Indexed Prompt Table for frequently used prompts. The IND screen will be displayed in response to selecting IND and will be described with respect to FIG. 16.

The MIS selection permits deleting voices from the Voice File and rebuilding PEP cache tables. The MIS screen will be displayed in response to selecting MIS and will be described with respect to FIG. 23.

With reference to FIG. 4, a telephone connection to SPIN 12 can be effected through the telephone 45 via NAP 11 for the purposes of recording or playing back voice through SPIN 12. Accordingly, voice can be recorded for elements in the NAP Voice File 33 with associated NAP Message IDs returned by NAP 11 to SPIN 12. The link 39 between the telephone 45 and the NIU 31 is schematically representative of an appropriate connection. For example, the NAP 11 and SPIN Administration Facility 40 may be located at a premises serviced by a PABX. A port of the NIU 31 may be assigned to SPIN 12. The connection of the telephone 45 to NAP 11 may be effected by dialing the telephone number of the SPIN assigned port and entering the SPIN User ID on the telephone keypad. In accordance with NAP protocol as described in said Patent No. 5,133,004 and under control of the SPIN Control Logic 49, SPIN 12 associates the telephone call with the current terminal session with respect to the SPIN application being processed. As discussed above with respect to FIG. 9, a user creates or logs onto an existing SPIN application using the SPIN Application Selection screen, entering an appropriate SPIN User ID. As described with respect to FIG. 8, the SPIN User ID is displayed on the bottom of the screen and the OFFLINE/ONLINE field displays whether or not the telephone 45 is connected to the SPIN terminal session. SPIN 12 communicates with Expand Prompts 60, via the path 78, to play prompts to the user through the telephone 45 for controlling the recording or playing of voice. The SPIN Prompts block 77 schematically illustrates this function.

Referring to FIG. 11, the Element Processing screen (ELE) 250 is illustrated. Elements are the components or building blocks of prompts owned by SPIN applications. The elements provide the voice for a prompt by maintaining the NAP Message IDs that point to voice stored in the NAP Voice File 33 (FIG. 4). The ELE screen 250 is utilized to process elements by entering the appropriate function into the "Action" field. The element processing functions are: CReate, MOdify, DElete and PLay. By entering the appropriate function new elements can be created, existing elements can be modified, an existing element can be deleted and element voice can be played back, respectively. The ELE screen 250 also provides for recording voice for elements by the telephone 45 (FIG. 4) and loading pre-recorded voice from a named Voice File. In order to record or play back voice, the ONLINE message should appear at the bottom of the ELE screen with a telephone connection established, as described above. The ELE screen includes display fields providing information about an element previously entered, input fields for element processing, and five lines to enter the script of the element. The "Msg. Id." fields 253 contain the NAP Message IDs that point to voice for the element in the Voice File 33. Each inflection with which voice is recorded—neutral, rising, and falling—is assigned a unique Message ID.

To create a new element, "CR" is entered in the "Action" field and an element name unique to the SPIN application is entered in the "Element name" field 251. A Text Locator unique to the SPIN application to describe the element's voice is entered in the "Text locator" field 252. If a text locator is not entered, the element name is used as a default value. The text locator is used to expand dynamic element type 2. The "Record now?" field is used to control the session during which voice for the element will be recorded. To record voice when the element is created, "Y" is entered. Alternatively, pre-recorded voice for the element may be loaded from a file named in the "Voice file name" field. The "Inflection" field denotes the intonation with which voice for the element is recorded. By convention, static elements are always recorded with neutral inflection. Dynamic elements can be recorded with neutral, rising and/or falling inflection depending on the Dynamic Element Table and the MDDP that uses it. The text equivalent of the elements recorded voice is entered into the "Script" field. If a voice is recorded, the NAP Message ID for the recorded voice message is returned by NAP 11 to SPIN 12. If element voice is recorded in different inflections, separate NAP voice messages are created in the Voice File 33 and unique NAP Message IDs therefor are returned to SPIN 12.

When all of the element information is entered, an appropriate key on the keyboard 44 is depressed and a record is created in the SPINDB 15 by the Record Management Logic 48 containing all of the information. When the element voice is recorded, the element script is spoken into the telephone 45 in the language supported by the SPIN application that is being processed. The element record in SPINDB 15 therefore contains the element name, text locator, inflection, NAP Message ID for each inflection, the voice script, and the SPIN application for which the element was created.

In order to modify an element, "MO" is entered into the "Action" field and the name of the element is entered into the "Element name" field. All of the information is then retrieved from the appropriate record 41 by the Record Management Logic 48 and displayed on the ELE screen via the Screen Management Logic 46. Screen values can be changed or added and voice can be recorded or re-recorded and the SPINDB 15 record updated by pressing the appropriate key on the keyboard 44.

An element can be deleted or played back by entering the appropriate action and identifying the element by name or text locator.

Referring to FIG. 12, the Prompt Processing screen (PRO) 210 is illustrated. The PRO screen 210 is used to create and maintain prompts in SPINDB 15. Prompt processing consists of creating, modifying, deleting and playing back prompts for SPIN applications. These activities are initiated in a manner similar to that described with respect to the ELE screen of FIG. 11 utilizing the "Action" field at the top of the screen.

A prompt is created by entering CR in the "Action" field and entering a prompt name unique to the SPIN application in the "Prompt Name" field 216. The "Item Number" display field 215 shows the order in which the prompt items will be played. If the item will play a static element, the element name is entered in the "Element Name" field 213 for the item and the "Dynamic Element Type" field 214 for the item is left blank. If the item will play dynamic data supplied in a PEP command by a Network Application 10 at run time, its dynamic element type is entered in the "Dynamic Element Type" field 214 for the item and the "Element Name" field 213 for the item is left blank. In other words, the Item Number field and the entries in fields 213 and 214 define the prompt mapping for the SPIN application.

A standard dynamic element type is designated by entering a digit from 0 through 8. User-defined dynamic element types for a SPIN application are designated by entering a number from 100 through 999. A custom MDDP is utilized to process these user-defined dynamic element types. Dynamic element types 9–99 are reserved for SPIN/PEP.

The standard dynamic element types are as follows:

0 Message ID

To play voice pointed to by the Message ID.

1 Date And Time

To play back the date and/or time.

2 Text Locator

To play the voice associated with the element containing this text locator.

3 Cardinal Number

To play cardinal numbers. For example, the cardinal number 124 is played as one hundred twenty-four rather than one, two, four.

4 Digit String

To play digits rather than numbers. For example, the string 124 is played as one, two, four rather than one hundred twenty-four.

5 Phone Number

To play digits with the proper inflection of a telephone number.

6 Money

To play back the monetary value.

7 Alphanumeric

To play alphanumeric characters from the set zero through nine, A through Z, pound (#), and star (*).

8 Element Name

To play the voice associated with the element having the element name.

If a prompt item represents a dynamic element by a "Dynamic Element Type" being specified for the item, a subtype can be entered in the "Dynamic Element Subtype" field 212 for the item. This user-specified subtype can be used to vary how the data for that dynamic element is played. A corresponding MDDP is customized and used by the SPIN application to recognize the specified subtype and to "play" the dynamic data in the desired format. Thus, the "Dynamic Element Subtype" field permits the SPIN application's custom MDDP to vary the format in which the dynamic data is played. For example, a subtype can be used to play the date as "January 2nd" or "the 2nd of January". A subtype can also be used to accommodate languages that require gender-specific adjectives.

If a prompt item represents a dynamic element by a "Dynamic Element Type" being specified for the item, a "Dynamic Data Location" field 211 permits dynamic data usage ordering information to be entered. In the absence of an entry in the "Dynamic Data Location" field, the dynamic data of each dynamic element type in a PEP command specifying the prompt is used in the order implied by the Item Number. The usage order in which the dynamic data will be played corresponds to the sequential order of the data within the specified dynamic data type of the PEP command. If a value is specified for the "Dynamic Data Location" field, the specified value provides dynamic data usage reordering information. If a dynamic data location of zero (0) is specified, no dynamic data from the PEP command is used for this dynamic element and no voice is played.

Referring to FIG. 13, the PRO screen of FIG. 12 is displayed exemplifying the creation of a new prompt "PR0123". The new prompt has a prompt mapping or definition as follows: PR0123=E123A, <DYN3 >, <DYN2>, E123B, <DYN3 >, <DYN2 >, E123B, AND, <DYN3 >, <DYN2 >, E123B.

The static elements named in prompt PR0123 play voices as follows: E123A plays "you have"; AND plays "and"; E123B plays "messages".

A Network Application 10 issues a PEP command at a particular run time to play prompt PR0123 as follows: "You have two new messages, ten saved messages, and five urgent messages." The sequential order of the dynamic data within the specified dynamic data types in the PEP command is as follows:

Type 3 (Cardinal Number), Dynamic Data Location #1: "2"
Type 3 (Cardinal Number), Dynamic Data Location #2: "10"
Type 3 (Cardinal Number), Dynamic Data location #3: "5"
Type 2 (Text Locator), Dynamic Data Location #1: "new"
Type 2 (Text Locator), Dynamic Data Location #2: "saved"
Type 2 (Text Locator), Dynamic Data Location #3: "urgent"
and the voice for each text locator is the same as the locator itself.

It is appreciated therefore that the dynamic data is sent in the PEP command as follows: The first cardinal number in the command (that is, Dynamic Data Location 1 for Dynamic Element Type 3) is "2"; The first text locator in the command .(that is, Dynamic Data Location 1 for Dynamic Element Type 2) is "NEW"; The second cardinal number in the command (that is, Dynamic Data Location 2 for Dynamic Element Type 3) is "10"; The second text locator in the command (that is, Dynamic Data Location 2 for Dynamic Element Type 2) is "SAVED"; The third cardinal number in the command (that is, Dynamic Data Location 3 for Dynamic Element Type 3) is "5"; The third text locator in the command (that is, Dynamic Data Location 3 for Dynamic Element Type 2) is "URGENT".

In other words, Dynamic Data Locations #1, #2, #3 contain the first, second, and third dynamic data, respectively, of the indicated type to be sent by a Network Application in a PEP command to request playback of the prompt.

Since the "Dynamic Data Location" fields on the screen of FIG. 13 are all defaulted, the dynamic data in the PEP command (the ESP or EMSP command) is used in sequential order within the specified dynamic data type and the prompt is played as described above.

The prompt is modified using the PRO screen of FIG. 13 by entering "MO" in the "Action" field and the name of the prompt to be modified in the "Prompt Name" field. The Modified Items For Prompt (PROMOD) screen 220 illustrated in FIG. 14 then appears on the monitor screen 43 (FIG. 4) with the values of the specified prompt displayed. The PROMOD screen 220 includes "Item #" fields 225, "Element Name" fields 223, "Dynamic Element Type" fields 224, "Dynamic Element Subtype" fields 226, "Dynamic Data Location" fields 221, and "Ins?" fields 222. The fields 225, 223, 224, 226, and 221 correspond to fields 215, 213, 214, 212, and 211, respectively, of FIG. 12. FIG. 14 is exemplified using the previously described illustrative prompt PR0123.

A prompt item is modified by typing new values therein and an item is added by entering the item at the first unused item number. An item is deleted by blanking out the values thereof. An item is inserted before an existing item by entering "Y" in the "Ins?" field 222 at the location where the item is to be added. Existing prompt items are moved down and renumbered and a blank line appears for the new item.

Dynamic data usage reordering is accomplished from the PROMOD screen 220 by overwriting any displayed Dynamic Data Location value with a different value. By specifying a different value, the order is changed in which the dynamic data supplied in a PEP command is used during prompt expansion. The modified prompt values are updated in SPINDB 15 (FIG. 4) and the Expand Prompts logic 60 of PEP 13 performs the reordering.

For example, with reference to FIG. 15, if the PRO123 prompt were modified as shown by the bolded and underlined information, and using the same command and voices discussed above, PEP 13 would expand and play this modified PR0123 prompt as: "You have five urgent messages, two new messages, and seven saved messages". Since the dynamic data usage is reordered according to the specified dynamic data locations, the prompt plays in this modified manner through the Network Application without having to make any changes to the PEP command issued by that Network Application.

A prompt can be deleted or played back by entering the appropriate Action and identifying the prompt by name on the PRO screen of FIG. 12. If the delete action is requested, the prompt is deleted from SPINDB 15.

It is appreciated from the foregoing, that using the SPIN screens described, a set of prompts can be constructed with an element ordering and speaking sequence for a SPIN application for a particular spoken language. The dynamic data in the PEP commands are entered in the commands in a predetermined format independent of the language. Using the SPIN screens, another SPIN application for another language can be constructed with elements reordered and speaking sequences modified to accommodate language differences.

Element order is the order in which a prompt's static and dynamic elements are to be played. Element order is established by the sequence in which the static and dynamic elements are presented in the prompt's definition.

Dynamic data order is the order in which the Network Application supplies the dynamic data in the prompt command. Prior to this invention, dynamic data was supplied in the order it was to be used. In the ESP command, the dynamic data order was sequential within a dynamic data type; in the EMSP command, the dynamic data order was sequential within a prompt.

Dynamic data usage is the order in which PEP uses or processes the dynamic data in the prompt command. Prior to this invention, the dynamic data in the prompt command was used in the order it was supplied. When PEP processed an ESP command, the dynamic data usage was sequential within a dynamic data type; when PEP processed an EMSP command, the dynamic data usage was sequential within a prompt.

To accommodate phrase ordering differences between languages, the present invention provides for the reordering of elements and for the reordering of the dynamic data usage while maintaining the dynamic data order supplied by the Network Application. The reordering information is supplied, as described above, via the SPIN screens so that all changes are external to the Network Application and to PEP. The reordering information is saved in SPINDB 15 and used by PEP 13 when the prompt is expanded.

Specifically, with respect to static element reordering, the mapping of static elements within a prompt can be reordered as necessary, along with their relationship to dynamic elements. For instance, one language may say "5 messages" while another says "messages 5". The prompt mappings within the two SPIN applications might be <DYN3 >, E1000, while the other is E1000w <DYN3 >. With respect to dynamic element reordering, a Network Application always orders dynamic data within the PEP command without regard to language. SPIN/PEP allows the speaking order to be designated independently of data order. The SPIN application can also specify that a certain piece of dynamic data not be played, if that is required for a language. As discussed above, a Dynamic Data Location of zero specifies that the piece of dynamic data will not be played. With respect to dynamic subtypes, some languages, such as Spanish, require gender agreement between adjectives and nouns. While English can say "1 woman" or "1 man", Spanish requires "1" to be spoken differently based on the gender of the associated noun. A SPIN application can specify a "subtype" associated with a dynamic element so that when <DYN3 >is used in a prompt with a feminine noun, the element subtype is passed to the MDDP which can select the feminine "1" and the reverse for a phrase with a masculine noun. Additional Dynamic Element Table entries are added to support the masculine and feminine numbers.

Referring to FIG. 16, the Indexed Prompt Table (IND) screen is illustrated for managing the Indexed Prompt Table illustrated in FIG. 5C. Only one Indexed Prompt Table exists for each SPIN application. To play any of the prompts in the Indexed PrOmpt Table their index values are specified in the EMSP command, as described above. In the illustrated IND screen of FIG. 16, Entry Indices 0–12 are utilized for SPIN/PEP purposes which will not be described herein for brevity. Entry Indices 13–25 are utilized in a SPIN application to enter prompts for which it is desired that a fast access path be provided for the Network Application. The prompt name is entered at the Entry Index. The Indexed Prompt Table is modified by blanking out a Prompt Name or replacing it with a new Prompt Name. In a preferred embodiment, Entry Indices 0–25 are utilized for SPIN/PEP purposes and Entry Indices 26–999 are utilized for Network Application prompts. MORE screens (not shown) are utilized for this purpose.

Referring to FIG. 17, the Dynamic Element Table (DYN) screen 230 is illustrated with Row Number field 231, Index fields 232, and Element Name fields 233. Row 9 of the Dynamic Element Table of FIGS. 5D and 5D1 is displayed. The DYN screen 230 is utilized to create rows in the Dynamic Element Table; add, modify or delete elements in a specified row; delete a row or the whole table; and play back voice for a specified row. A Dynamic Element Table and an MDDP can be created and maintained within SPIN/PEP for each SPIN application. When the Dynamic Element Table is altered utilizing the DYN screen 230, corresponding changes may be required to the MDDP that processes the dynamic data for the Network Application.

Each Dynamic Element Table provides ordered lists of logically grouped elements that are required to "speak" dynamic data for the associated SPIN application. The MDDP is utilized by the SPIN application to expand the dynamic data for a prompt. The MDDP is encoded with the knowledge of both the desired "speaking" format for the dynamic data and of the grouping and ordering of the elements within the Dynamic Element Table. As illustrated in FIG. 4, multiple MDDPs associated with respective SPIN applications can be used to concurrently support multiple spoken languages. A SPIN application's Dynamic Element Table together with its MDDP enable PEP 13 and NAP 11 to expand and "speak" any type of dynamic data supported for a SPIN application. Neither the Network Application nor the PEP/NAP software requires any changes to accommodate format and/or language-specific differences required to "speak" the dynamic data for a prompt. All changes are external to the Network Application software and to the PEP/NAP system software.

The Dynamic Element Table organizes various specific elements in related groups, or rows, for reference by its associated MDDP; the elements being utilized and selected at Network Application run time to expand the dynamic data specified in the PEP command. For example, one row may contain elements for the days of the week. Because spoken languages share a seven day week, MDDPs for many languages can refer to Monday using the same index (row, column), but referring to Dynamic Element Tables from different SPIN applications.

The Dynamic Element Table for a SPIN application resolves into rows and columns of NAP Message IDs. The MDDP generates a list of element references (row, column) to this table. It is appreciated that the MDDP does not directly access an array of NAP Message IDs. This is a safeguard to prevent a user-written MDDP program from potentially altering the contents of a table of NAP Message IDs. If such an MDDP unintentionally alters the contents of an array of NAP Message IDs, an operational error could occur that would be very difficult to detect and debug.

It is appreciated that the size of a group (row) of a Dynamic Element Table may change based on the conventions of a language. Where civilian, American English commonly refers to AM and PM to specify time of day, a military, American English MDDP might not refer to AM or PM and would not require that row in the Dynamic Element Table. Conversely, a language that separates a day into five periods, dawn, morning, midday, evening, night, would require a Dynamic Element Table with a row analogous to AMPM, but containing five entries rather than two. A SPIN application designer can allocate the rows and columns of the Dynamic Element Table and build spoken dynamic elements via the MDDP using references to the table in any appropriate manner in accordance with the language that the SPIN application supports.

Each SPIN application for a given Network Application can specify a unique MDDP. The MDDP can be customized to format spoken dynamic data to match the requirements of a language. For example, the language supported by a SPIN application may require altering the sequence in which the date and time are played and may require other changes based on the language. Modified standard dynamic element types or subtypes and new types created for a SPIN application must be supported by a customized MDDP. All such modifications or additions may require corresponding modifications to the Dynamic Element Table. A specific example of such a modification is the use of 12 versus 24 hour clocks to state the time of day. Users can create any new dynamic element type. The MDDP constructs spoken phrases through reference to the Dynamic Element Table defined for the SPIN application. This provides a consistent programmatic method that can be utilized across a wide variety of spoken syntax.

In a manner to be described, a SPIN application named SYSTEM may be utilized. If the Dynamic Element Table provided with the SYSTEM application and/or the standard MDDP meet the requirements of a SPIN application, a unique Dynamic Element Table and/or MDDP need not be provided.

With continued reference to FIG. 17, the DYN screen 230 is illustrating displaying row 9 of the Dynamic Element Table of FIGS. 5D and 5D1. A new row in the Dynamic Element Table can be created by selecting the CReate Action and entering an appropriate Row Number and Row Name. The appropriate Element Names can be entered as illustrated along with the appropriate Inflection. In a similar manner, an existing row can be modified by selecting the MOdify Action and entering the desired Row Number or Row Name on the screen.

In a manner similar to that described above with respect to elements and prompts, a row in the Dynamic Element Table can be deleted or played back by selecting the appropriate action.

Referring to FIGS. 18–20, the procedure for adding a new dynamic element type to a SPIN application is now described. For example, the new dynamic element type may be dynamic element type 100 standing for color. A new prompt named PCOLOR is created using the new dynamic element type. The prompt PCOLOR contains two items: the static element ECOLOR and dynamic element type 100. The prompt mapping is: PCOLOR=ECOLOR, <DYN100>. The prompt will say: "Your bicycle is <a color>". FIG. 18 illustrates the Prompt Processing screen 210 creating the prompt PCOLOR.

The next step is to create the static element ECOLOR and its voice. ECOLOR points to the voice that says, "Your bicycle is". FIG. 19 illustrates the Element Processing screen 250 creating the static element ECOLOR.

The next step involves using the Element Processing screen 250 to create elements for each color that the application will require: CRED, CBLUE, CYELL, CGREEN, and CPURP. Voice for each element is recorded.

The next step involves creating a row in the Dynamic Element Table, for example, row 100, with the Row Name COLORS. The name of each new color is entered into this row. FIG. 20 illustrates the Dynamic Element Table screen 230 for entering the new dynamic elements into the Dynamic Element Table for the SPIN application.

The MDDP for the SPIN application is modified to support the new dynamic element type by adding a DYN100 procedure 74 (FIG. 4) to support it. The DYN100 procedure added to the MDDP 14 returns element references to entries in the new Dynamic Element Table row for Colors (row 100). The new prompt can be played by a Network Application by issuing a PEP command requesting the playing of PCOLOR. The PEP command supplies the dynamic data required for dynamic element type 100. Predicated on this example, the element references for each supported color are: CRED (100,0); CBLUE (100,1); CYELL (100,2); CGREEN (100,3); and CPURP (100,4).

Referring to FIG. 21, the Transfer (TRA) screen 240 is illustrated. The TRA screen 240 provides the interface for transferring one SPIN application to another. Alternatively, a transfer can be effected from a file to a SPIN application and from a SPIN application to a file. This functionality is utilized to support the multi-lingual capability by copying a SPIN application in one language into another SPIN application to create a new SPIN application in another language. The copy is then modified in accordance with the requirements of the new language utilizing the SPIN screens described above.

The TRA screen 240 makes it possible to copy selected application data or an entire application from one SPIN application to another, or to and from a file. The TRA screen 240 is utilized to transfer all the components of a SPIN application or to selectively transfer any combination of prompts, elements, voice, scripts, Dynamic Element Table and Indexed Prompt Table. SPIN 12 (FIG. 4) provides two different Actions to transfer SPIN application information: COpy and ADd. The COpy Action copies all or selected parts of an application to another application or to a file. When the transfer is to another application, the COpy function overwrites items of the same name that already exist in the destination application. Thus, COpy is selected as the Action to copy SPIN application data and overwrite existing data in the destination application or file. The ADd Action transfers an application or its selected parts to another application only if the transferred item does not already exist in the destination application. Thus, the ADd Action is selected to add SPIN application data to another SPIN application without overwriting existing data in the destination SPIN application.

The "From" and "To" fields are utilized to name the source and destination applications and files. An entire application is transferred by entering "Y" in the "Entire Application?" field. If it is desired to selectively transfer all of the Prompts, Elements, Voice, or Scripts, an appropriate entry is effected in the associated "All?" field. Alternatively, a list of Prompts, Elements, Voice, or Scripts can be created and transferred. FIG. 22 illustrates the ENTER PROMPTS FOR TRANSFER screen for creating or modifying a list of Prompts to be transferred. Similarly, other screens are displayed for transferring lists of Elements, Voice and Scripts. To transfer a list of components, the list is first created or modified by entering "Y" in the appropriate "Update <Component>List?" and after the list is created or modified from the appropriate ENTER <COMPONENTS>FOR TRANSFER screen, a "Y" is entered in the appropriate "List" field.

The TRA screen of FIG. 21 also includes an entry for selectively transferring the Dynamic Element Table and the Indexed Prompt Table from the source to the destination.

Referring to FIG. 23, the Miscellaneous Functions (MIS) screen is illustrated. The MIS screen includes a "VOIDEL" choice utilized to delete voices from the Voice File 33 (FIG. 4). Superfluous voices from the NAP Voice File 33 are marked for deletion when the associated element is deleted. The actual voice is deleted from the MIS screen.

The "CACHE" choice initiates building of the cache tables 64 (FIG. 4) from the SPINDB 15. As previously described, the information regarding the elements, prompts, Dynamic Element Table and Indexed Prompt Table entered from the keyboard 44 into the records 41 are cached in cache tables 64 in the table formats illustrated in FIGS. 5A–5D and 5D1.

In operation, with continued reference to FIG. 4, a Network Application 10 issues a PEP command to the agent 16 which directs the command to Expand Prompts 60. The PEP command includes the name or index number of the prompt to be played, the name of the associated SPIN application and the dynamic data for the prompt. Expand Prompts 60 consults the appropriate prompt table (FIG. 5B or 5C) for the prompt mapping in the cache tables 64 for the named SPIN application. As indicated by the legend, Expand Prompts 60 uses the prompt name (or index) to retrieve from the cache tables 64 the NAP Message IDs corresponding to the static elements of the prompts. Expand Prompts 60 places these NAP Message IDs in an output buffer (not shown) in the appropriate locations in accordance with the prompt mapping.

For each dynamic element in the prompt mapping, Expand Prompts 60 sends the dynamic element type and subtype and the corresponding dynamic data from the PEP command to the appropriate procedure in the MDDP 14 for the SPIN application. As indicated by the legend, the MDDP 14 returns a sequence of element references corresponding to the dynamic data in the PEP command for the dynamic element type/subtype in the order prescribed by the associated dynamic element type procedure. Expand Prompts 60 uses the element references to the associated Dynamic Element Table (FIG. 5D, 5D1) in the cache tables 64 and retrieves the sequence of NAP Message IDs corresponding to the element references. Expand Prompts 60 inserts these NAP Message IDs for each dynamic element in the prompt mapping into the appropriate locations in the output buffer of Expand Prompts 60.

Expand Prompts 60 then exports the contents of its output buffer to the agent 16 which constructs a NAP Send Voice Message command incorporating the sequence of NAP Message IDs received from Expand Prompts 60. The agent 16 sends this Send Voice Message command directly to AIM 30 of NAP 11. NAP 11 then plays the prompt over the telephone connection established by the Network Application 10 extracting the voice from the Voice File 33 in accordance with the sequence of NAP Message IDs. Upon successful transmission of the prompt, NAP 11 returns the appropriate Message Sent response to the agent 16. The agent 16, in turn, sends a Prompt Sent response to the requesting Network Application 10 to complete the NAP Command/Response protocol with respect to the issued PEP command.

Once a Network Application and all associated SPIN entities (prompts, elements, Dynamic Element Table, MDDP, and Indexed Prompt Table) are developed for one language, for example, American English, only the following steps are utilized to support a new language:

SPIN is used to:
1) Create a new SPIN application with a new SPIN application ID for the new language. The SPIN Application Selection screen of FIG. 9 can be used for this purpose.
2) Copy all SPIN entities except digitized voice from the initial SPIN application to the new SPIN application. The TRA screen of FIG. 21 can be used for this purpose.
3) Record voice for each element in the new SPIN application in the new language.

Alternatively, pre-recorded voice in the new language for each element can be loaded. The ELE screen of FIG. 11 can be used for this purpose.

4) Reorder the static and dynamic elements and/or the dynamic data usage in the prompts of the new SPIN application to accommodate any phrase ordering and grammatical differences between the languages. The PRO screen of FIG. 12 and the PROMOD screen of FIG. 14 can be used for these purposes.

5) Create and record voice for new elements or delete elements as required for the new language. The ELE screen of FIG. 11 can be used for these purposes. In particular, if required by the new language, modify the Dynamic Element Table to provide the ordered groups of elements needed to expand and play dynamic data in the new language. The DYN screen of FIG. 17 together with the ELE screen of FIG. 11 can be utilized for this purpose. Modify the MDDP to accommodate any changes to the Dynamic Element Table.

6) If necessary, create a custom MDDP to accommodate any language-specific requirements in the dynamic data format for the new language.

7) Add the SPIN application ID of the new SPIN application to those recognized and used by the Network Application so that the Network Application can then provide the SPIN application ID that "speaks" the new language in requests to play prompts.

The SPIN application IDs are the Network Application's only awareness of the multiple languages that it supports. Thus, the Network Application is completely ignorant of the syntactic requirements of any spoken language. Utilizing the invention makes it possible for the same Network Application to play its prompts in a plurality of spoken languages merely by selecting the language via a simple token. The Network Application is not required to select different prompts nor provide different dynamic data based on the language. The present invention provides the ability to customize both the spoken voice and grammatical organization of a Network Application's prompts without altering the functional code of the Network Application. The invention isolates the customization of the spoken prompts from the call flow and programmatic logic of the Network Application.

Dynamic data is structured and ordered in a PEP command, as described above, in a predetermined pattern independent of the language supported by the SPIN application. PEP 13 and the MDDP 14 expand the commanded prompt, reordering dynamic data usage in accordance with the requirements of the language. The information supplied via the PRO and PROMOD screens of FIGS. 12 and 14, respectively, are utilized for this purpose. Additionally, the MDDP 14 further modifies the manner in which the dynamic data is spoken in accordance with an entered Dynamic Element Subtype.

From the foregoing, it is appreciated that a new SPIN application for speaking a particular language can be created from scratch. The SPIN screens, as described above, are utilized to create each element, voice, prompt, Dynamic Element Table and Indexed Prompt Table required by the new SPIN application. In addition, a custom MDDP is created to process the dynamic data for the prompts based on the requirement of the language and the created Dynamic Element Table.

To facilitate creating a SPIN application from an existing application, a SPIN application named SYSTEM may be utilized. The SYSTEM application contains the Dynamic Element Table described above with respect to FIGS. 5D and 5D1 and the above-described standard MDDP which is utilized therewith. FIG. 24 illustrates the Indexed Prompt Table for the SYSTEM application. The SYSTEM Indexed Prompt Table contains prompt names for the prompts required by PEP 13 for handling certain error conditions, providing a standard greeting for a Network Application, providing the voice, beep or tone that notifies a caller to begin recording a message and providing a prompt that plays one second of silence after another prompt is played. The SYSTEM application would include all of the elements and prompts required by SPIN, the MDDP, the Dynamic Element Table and the Indexed Prompt Table, as well as voice for all elements. It is appreciated that all components of the SYSTEM application support standard American English only. Any entities associated with the SYSTEM application may be utilized as the default for Network Applications. The SYSTEM application can be utilized as the basis for creating another SPIN application for another language, as explained above.

If the Dynamic Element Table provided with the SYSTEM application and/or the standard MDDP meet the requirements of a SPIN application, a unique Dynamic Element Table and/or MDDP need not be provided.

It is appreciated from the above, that multiple Network Applications can share the same SPIN application providing the Network Applications share a common set of prompts. The present invention permits a single MDDP to be shared by SPIN applications that "speak" the same language and permits a different MDDP to be utilized by each SPIN application that "speaks" a different language or dialect.

In accordance with the invention, a SPIN application ID designates a set of prompts and their related entities in the SPIN data base and in the Voice File. In addition, the SPIN application ID provides a unique identifier that represents both the set of prompts that a Network Application can play and a specific language that the Network Application "speaks". The SPIN application ID is the Network Application's sole awareness of the languages that it supports and of the pre-recorded voice elements with which it "speaks" these languages. Multiple SPIN applications can be concurrently utilized. Each SPIN application for a given Network Application supports the complete set of prompts required for that Network Application. The SPIN application "owns" the complete set of prompts, elements, voice, Dynamic Element Table, Indexed Prompt Table, and MDDP. The static elements can be ordered differently within a prompt "owned" by different SPIN applications to accommodate the order differences in the syntax and phrasing of a particular language. Dynamic elements can be ordered differently within a prompt "owned" by different SPIN applications without regard to the order in which the Network Application places the data in a PEP command. This again accommodates order differences in the phrasing and syntax of different languages.

The SPIN/PEP multi-lingual capabilities described above can also be used for other purposes. For example, a Network Application might offer prompts spoken by a man or by a woman. Two SPIN applications would be utilized with separate digitized voice, but the SPIN applications could use identical MDDPs, prompt mappings, and Dynamic Element Tables.

The present invention decreases the cost and effort required to support multiple spoken languages from the same Network Application by eliminating the need for the large majority of the programming changes to support different languages that would otherwise be required to a Network Application or to the PEP.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. In combination with a Network Application Platform (NAP), a prompt management system for playing prompts comprised of elements, said NAP operative to play voice messages in response to NAP Message IDs, respectively, each element marking a position in a prompt for playing at least one of said voice messages, said NAP supporting at least one Network Application for execution thereby, comprising a plurality of information sets, independent of said Network Application, containing information for playing said prompts in a plurality of languages, respectively, said information sets identified by a plurality of information set IDs, respectively, said information of each of said information sets including a set of prompt definitions comprised of sequences of said elements, each said prompt definition identified by a prompt ID, said information of each of said information sets including NAP Message IDs corresponding to said elements of said prompt definitions, and a Prompt Expansion Processor (PEP) having access to said information sets and responsive to a command from said Network Application to play a prompt, said command identifying a commanded prompt to be played and a language in which to play said commanded prompt by including said prompt ID and said information set ID, respectively, in said command, said PEP operative, by accessing one of said information sets with information set ID identified by said command, to expand said commanded prompt into a sequence of NAP Message IDs corresponding to said elements of said prompt definition of said commanded prompt, said sequence of NAP Message IDs being sent to said NAP to play said voice messages corresponding to said sequence of NAP Message IDs so as to play said commanded prompt in said language corresponding to said information set ID, said command including dynamic data to be played in said commanded prompt, said elements comprising static and dynamic elements, said static elements marking positions in said prompts for playing predetermined ones of said voice messages, said dynamic elements marking positions in said prompts for playing said dynamic data, said prompt definition of said commanded prompt comprising a sequence of said static and said dynamic elements, said information of each said information set including NAP Message IDs corresponding to said static elements and said dynamic data, said PEP being operative to expand said commanded prompt into said sequence of NAP Message IDs corresponding to said static elements of said prompt definition of said commanded prompt and to said dynamic data for said dynamic elements of said prompt definition of said commanded prompt, said dynamic data of said command being categorized into predetermined dynamic element types, each of said dynamic elements of said prompts having one of said dynamic element types associated therewith, said PEP being operative to expand a dynamic element of a prompt into said NAP Message IDs corresponding to said dynamic data of said one of said dynamic element types associated with said dynamic element to be expanded, each said information set having a Modular Dynamic Data Processor (MDDP) associated therewith, said MDDP containing procedures for expanding, in accordance with said language associated with said information set, dynamic data of said dynamic element types, respectively, into element references representative of said NAP Message IDs corresponding to said dynamic data.

2. The system of claim 1 wherein said information of each said information set includes a Dynamic Element Table containing an ordered list of logically grouped elements for correlating said element references provided by said MDDP of said information set associated therewith into corresponding NAP Message IDs in accordance with said logically grouped elements.

3. The system of claim 2 further including a Speech Interface to NAP program (SPIN) for interactively creating or modifying said information of each said information set in accordance with said language associated therewith.

4. The system of claim 3 further including a terminal having a display and information entry means, said SPIN including screen management logic for generating screens on said display and information management logic for managing information entered by said information entry means by a user interacting with said screens for creating or modifying said information of said information sets, said information management logic providing information to said screen management logic for displaying, on said screens, information entered by said information entry means.

5. The system of claim 4 further including a SPIN Data Base (SPINDB) responsive to said Information Management Logic, said SPINDB containing records for storing said information of said information sets, said SPIN operative to create or modify said information stored in said records in accordance with said information entered by said information entry means.

6. The system of claim 5 wherein said PEP includes cache table sets for storing said information of said information sets, respectively, said PEP being operative to build said cache table sets from said records, said PEP being operative to expand said command into said sequence of NAP Message IDs by accessing a cache table set storing said information of said information set identified by said information set ID in said command.

7. The system of claim 4 wherein said prompt definition includes an element order established by the sequence in which said static and dynamic elements are ordered in said prompt definition, said screens including a prompt processing screen for creating or modifying said element order in accordance with requirements of said language associated with said information set that includes said prompt definition.

8. The system of claim 4 wherein said command provides said dynamic data in a predetermined dynamic data order, said prompt definition includes a dynamic data usage order in accordance with said positions marked by said dynamic elements in said sequence of static and dynamic elements, and one of said screens includes Dynamic Data Location fields for modifying said dynamic data usage order with respect to said dynamic data order in accordance with requirements of said language associated with said information set that includes said prompt definition.

9. The system of claim 8 wherein said Dynamic Data Location fields are utilized to indicate that specified dynamic data from said command will not be used for said dynamic elements by entering, via said information entry means, an appropriate indication in said Dynamic Data Location fields.

10. The system of claim 4 wherein one of said screens includes Dynamic Element Subtype fields for providing subtypes for said dynamic element types associated with said dynamic elements of said prompt definition, and said MDDP includes procedures for processing said dynamic data for said dynamic elements pursuant to said subtypes in accordance with said language associated with said information set that includes said prompt definition.

11. The system of claim 4 wherein said screens include at least one screen for adding elements for a new dynamic element type, said MDDP including a procedure for expanding dynamic data pursuant to said new dynamic element type in accordance with said language associated with said information set that includes said MDDP.

12. The system of claim 4 wherein said screens include a Dynamic Element Table screen for creating or modifying elements in said Dynamic Element Table, said MDDP being enhanced in accordance with said created or modified elements in said Dynamic Element Table.

13. The system of claim 4 wherein said screens include a transfer screen for selectively transferring part or all of said information from a first of said information sets to a second of said information sets, said first information set having a first language associated therewith, and thereafter modifying said information in said second information set, using said screens, in accordance with a language different from said first language.

14. The system of claim 13 wherein said second information set has an MDDP associated therewith, said MDDP including a procedure created or modified in accordance with said information modified with respect to said second information set.

15. The system of claim 3 wherein said SPIN is deployed on said NAP.

16. The system of claim 1 wherein said command comprises an Enhanced Multi-Send Prompt (EMSP) command including a field for said information set ID, said EMSP command containing at least one Prompt Information Cluster, each Prompt Information Cluster containing a Prompt Information Type (PIT) field and a Prompt Information Data (PID) field, said PIT field of a particular Prompt Information Cluster containing an indication that said PID field of said particular Prompt Information Cluster will either request a prompt or provide dynamic data for a requested prompt.

17. The system of claim 16 wherein said indication comprises an indication of dynamic element type when said PID field will provide said dynamic data.

18. The system of claim 17 wherein said PID field contains dynamic data of said dynamic element type indicated in said PIT field of said particular Prompt Information Cluster.

19. The system of claim 16 wherein said indication comprises an indication of a Prompt Index Value or a Prompt Name when said PID field will request a prompt.

20. The system of claim 19 wherein said PID field contains a Prompt Index Value or a Prompt Name in accordance with whether said PIT field of said particular Prompt Information Cluster indicates Prompt Index Value or Prompt Name.

21. The system of claim 16 wherein each said Prompt Information Cluster includes a Prompt Information Length (PIL) field designating the length of the Prompt Information Cluster including said PIL, PIT and PID fields.

22. For use with a prompt management system in combination with a Network Application Platform (NAP), said prompt management system for playing prompts comprised of elements, said NAP operative to play voice messages in response to NAP Message IDs, respectively, each element marking a position in a prompt for playing at least one of said voice messages, said NAP supporting at least one Network Application for execution thereby, said NAP operative to record voice messages and return NAP Message IDs, respectively, said prompt management system including a first information set containing information for playing said prompts in a first language, said first information set identified by a first information set ID, said information of said first information set including a set of prompt definitions comprised of sequences of said elements, each said prompt definition identified by a prompt ID, said information of said first information set including voice messages in said first language and NAP Message IDs corresponding to said elements of said prompt definitions, a method for selectively playing said prompts in said first language or in a second language comprising creating a second information set identified by a second information set ID, copying said information from said first information set to said second information set except for said voice messages and said NAP Message IDs, creating recorded voice messages by recording voice through NAP in said second language for each element in said second information set and entering into said second information set said NAP Message IDs returned by NAP corresponding to said recorded voice messages, reordering said elements of said prompt definitions of said second information set to accommodate any phrase ordering differences between said first language and said second language, creating new elements for said information of said second information set or deleting elements therefrom as required for said second language, issuing a command from said Network Application to play a prompt, said command identifying a commanded prompt to be played and the language in which to play said commanded prompt by including said prompt ID and said information set ID, respectively, in said command, accessing one of said information sets with information set ID identified by said command to expand said commanded prompt into a sequence of NAP Message IDs corresponding to said elements of said prompt definition of said commanded prompt, and sending said sequence of NAP Message IDs to said NAP to play said voice messages corresponding to said sequence of NAP Message IDs so as to play said commanded prompt in said first language or said second language corresponding to said information set ID.

23. The method of claim 22 wherein said command includes dynamic data to be played in said commanded prompt, said command providing said dynamic data in a predetermined dynamic data order; said elements comprise static and dynamic elements, said static elements marking positions in said prompts for playing predetermined ones of said voice messages, said dynamic elements marking positions in said prompts for playing said dynamic data; said prompt definition includes a dynamic data usage order in accordance with said positions marked by said dynamic elements in said sequence of static and dynamic elements; said method further comprises reordering, in said prompt definitions of said information of said second information set, said dynamic data usage order with respect to said dynamic data order to accommodate phrase ordering differences between said first and second languages.

24. The method of claim 23 wherein said dynamic data of said command is categorized into predetermined dynamic element types, each of said dynamic elements of said prompts having one of said dynamic element types associated therewith, said method further comprises creating a Modular Dynamic Data Processor (MDDP) containing procedures for expanding, in accordance with said second language, dynamic data of said dynamic element types, respectively, into element references representative of NAP Message IDs corresponding to said dynamic data, said MDDP being created to accommodate language specific dynamic data formats for said second language.

25. The method of claim 24 wherein said information of said second information set includes a Dynamic Element Table copied from said first information set, said Dynamic Element Table containing an ordered list of logically grouped elements, said method further comprises modifying said Dynamic Element Table in accordance with requirements of said second language, and correlating said element references provided by said MDDP into corresponding NAP Message IDs in accordance with said logically grouped elements.

* * * * *